(12) United States Patent
Teal et al.

(10) Patent No.: US 8,950,007 B1
(45) Date of Patent: Feb. 3, 2015

(54) POLICY-BASED WHITELISTING WITH SYSTEM CHANGE MANAGEMENT BASED ON TRUST FRAMEWORK

(75) Inventors: Daniel M. Teal, Austin, TX (US); Wesley G. Miller, Austin, TX (US); Charisse Castagnoli, Austin, TX (US); Toney Jennings, Horseshoe Bay, TX (US); Todd Schell, San Antonio, TX (US); Richard S. Teal, Media, PA (US)

(73) Assignee: Lumension Security, Inc., Scottsdale, AZ (US)

( * ) Notice: Subject to any disclaimer, the term of this patent is extended or adjusted under 35 U.S.C. 154(b) by 1058 days.

(21) Appl. No.: 12/695,816

(22) Filed: Jan. 28, 2010

Related U.S. Application Data

(63) Continuation-in-part of application No. 12/419,932, filed on Apr. 7, 2009, now abandoned.

(60) Provisional application No. 61/043,115, filed on Apr. 7, 2008.

(51) Int. Cl.
*G06F 21/10* (2013.01)

(52) U.S. Cl.
USPC .......................................................... 726/30

(58) Field of Classification Search
USPC .......................................................... 726/30
See application file for complete search history.

(56) References Cited

U.S. PATENT DOCUMENTS

| | | | |
|---|---|---|---|
| 6,208,952 B1 * | 3/2001 | Goertzel et al. | 709/230 |
| 6,301,668 B1 | 10/2001 | Gleichauf et al. | |
| 6,477,651 B1 | 11/2002 | Teal | |
| 6,490,723 B1 * | 12/2002 | Bearden et al. | 717/174 |
| 6,499,107 B1 | 12/2002 | Gleichauf et al. | |
| 7,290,147 B2 * | 10/2007 | Bittner et al. | 713/187 |
| 7,398,389 B2 | 7/2008 | Teal et al. | |
| 7,542,988 B1 * | 6/2009 | Cook et al. | 1/1 |
| 7,694,296 B1 * | 4/2010 | Kennedy | 717/175 |
| 7,814,465 B2 * | 10/2010 | Liu | 717/126 |
| 7,930,327 B2 * | 4/2011 | Craft et al. | 707/826 |
| 7,941,852 B2 * | 5/2011 | Repasi et al. | 726/22 |
| 8,104,089 B1 * | 1/2012 | Guo et al. | 726/24 |
| 2003/0120935 A1 | 6/2003 | Teal et al. | |
| 2005/0091192 A1 * | 4/2005 | Probert et al. | 707/1 |

(Continued)

OTHER PUBLICATIONS

Kernel WMI Object Security, 2006, Microsoft, Retrieved from the Internet <URL: msdn.microsoft.com/en-us/library/windows/hardware/gg463305>, pp. 1-10 as printed.*

(Continued)

*Primary Examiner* — Michael Chao
(74) *Attorney, Agent, or Firm* — Greenberg Traurig, LLP

(57) ABSTRACT

Techniques have been developed to allow runtime extensions to a whitelist that locks down a computational system. For example, executable code (including e.g., objects such as a script or active content that may be treated as an executable) is not only subject to whitelist checks that allow (or deny) its execution, but is also subject to checks that determine whether a whitelisted executable is itself trusted to introduce further executable code into the computational system in which it is allowed to run. In general, deletion and/or modification of instances of code that are already covered by the whitelist are also disallowed in accordance with a security policy. Accordingly, an executable that is trusted may be allowed to delete and/or modify code instances covered by the whitelist. In general, trust may be coded for a given code instance that seeks to introduce, remove or modify code (e.g., in the whitelist itself).

32 Claims, 10 Drawing Sheets

(56) References Cited

U.S. PATENT DOCUMENTS

2006/0064582 A1     3/2006    Teal et al.
2006/0150256 A1*   7/2006    Fanton et al. .................. 726/27

OTHER PUBLICATIONS

NThelp, a previous installation has pending work, 2001, Retrieved from the Internet <URL: web.archive.org/web/20011101044859/www.nthelp.com/50/aprevious.htm>, pp. 1-2 as printed.*

Whitelist "E-mail whitelists", Mar. 31, 2009, downloaded from http://en.wikipedia.org/wiki/Whitelist, 3 pages.

CoreTrace Technology "Introduction", CoreTrace Corporation, 2006-2008, pp. 1-7.

CoreTrace Whitepaper "Combating Buffer Overflows and Rootkits", CoreTrace Corporation, 2008, pp. 1-16.

CoreTrace Whitepaper "Application Whitelisting: A New Security Paradigm", CoreTrace Corporation, 2008, pp. 1-8.

CoreTrace Whitepaper "Application Whitelisting and Energy Systems—A Good Match", 2009, pp. 1-6.

Product Data Sheet "Faronics Anti-Executable", Faronics Corp., 2 pages, © 1999-2010.

Faronics "Anti-Executable Absolute Protection from Unauthorized Executables", Oct. 2, 2008, Faronics Corporation, pp. 1-3.

Faronics "Faronics Anti-Executable and Granite School District Case Study", Feb. 26, 2008, Faronics Corporation, pp. 1-4.

Faronics Anti-Executable Enterprise "User Guide", Sep. 2008, Faronics Corporation, pp. 1-37.

* cited by examiner

POLICY-BASED WHITELISTING WITH SYSTEM CHANGE MANAGEMENT BASED ON TRUST FRAMEWORK

CROSS-REFERENCE TO RELATED APPLICATION(S)

This application is a continuation-in-part of U.S. application Ser. No. 12/419,932, filed Apr. 7, 2009, entitled "Policy-Based Whitelisting with System Change Management Based on Trust Framework," naming Daniel M. Teal, Wesley G. Miller, Charisse Castagnoli, Toney Jennings, Todd Schell, and Richard S. Teal as inventors, which claims benefit under 35 U.S.C. §119(e) of U.S. Provisional Application 61/043,115, filed Apr. 7, 2008, each of which applications are incorporated herein by reference in their entireties.

BACKGROUND

1. Field

This disclosure relates generally to information processing system security, and more specifically, to security techniques that employ a whitelist technique for allowing and/or disallowing execution of code.

2. Related Art

Many conventional security solutions employ one of two basic techniques: blacklisting and whitelisting. In general, blacklisting involves blocking specified executions, accesses or behaviors, while whitelisting involves allowing specified executions, accesses or behaviors. Some security solutions employ both techniques.

One problem with conventional blacklisting approaches is that they attempt to block an ever evolving set of "bad things," typically using pattern matching and/or heuristics/behavioral analysis criteria that must be constantly updated. Unfortunately, the set of known "bad things" has generally defied manageable boundaries to the point that most security products still have false positives (which is bad since they can impede or stop work) and missed vulnerabilities (which is worse, since it can stop work or destroy computer systems completely).

On the other hand, a problem with conventional whitelisting is that, traditionally, implementations have been quite inflexible. Typical computer users are generally not satisfied working within the bounds of their systems. They stretch the bounds of their systems—adding ActiveX controls, scripts, installers, Java applets, applications, etc. By introducing new applications, tools and capabilities, the user is able to accomplish more—but generally, such introductions run counter to constraints enforced or desired (typically by a system administrator) to maintain a secure, managed environment. It is often said that usability and security are mutually exclusive. Indeed, true to the maxim, conventional whitelisting technologies have generally offered a strong whitelisting defense but, in practice, fall short of usability goals due to draconian limitations (or "lockdown" conditions) that constrain even legitimate user activity.

Improved techniques are desired.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

SUMMARY

Figure 1:
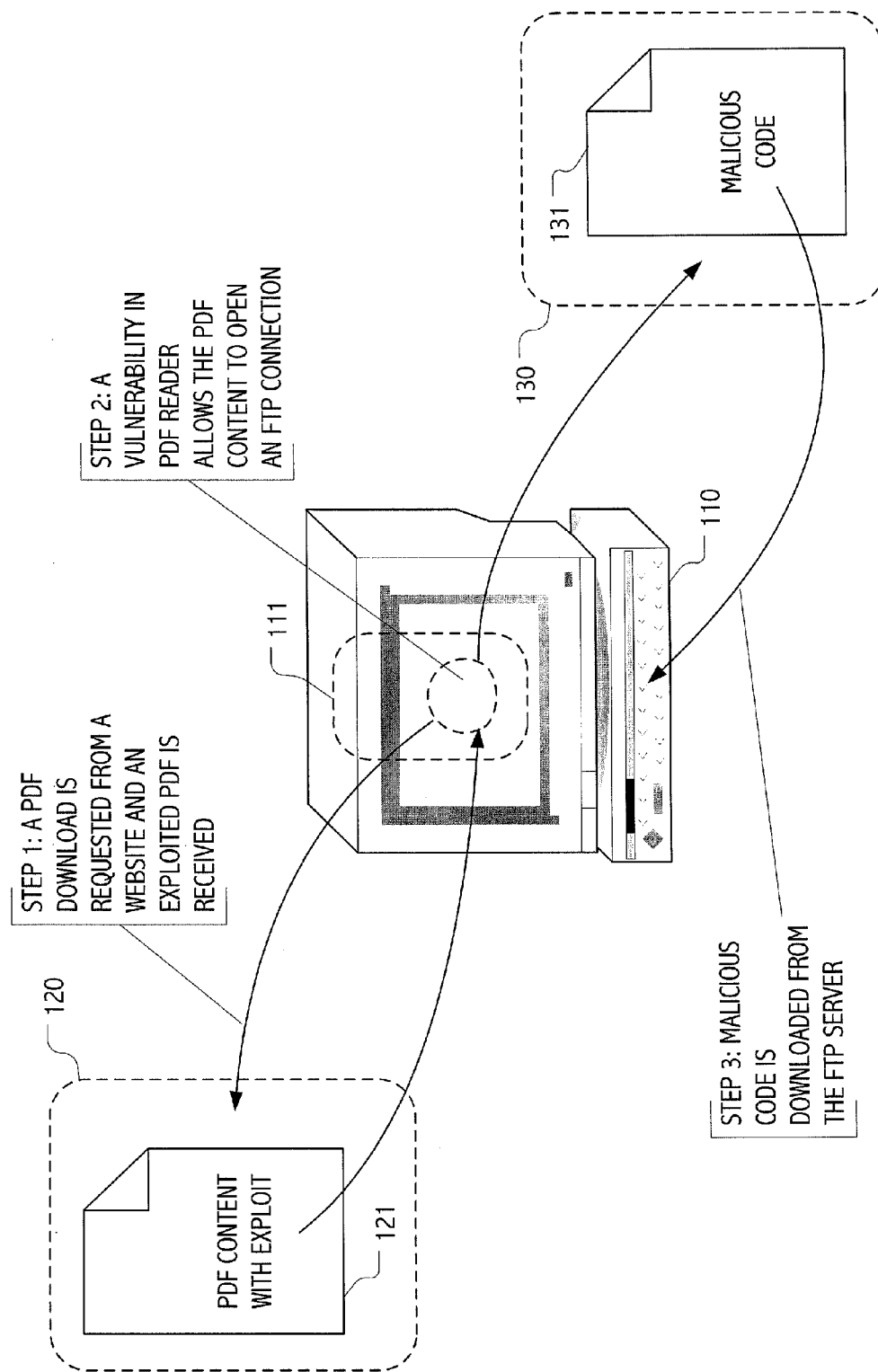
FIG. 1 is a flow diagram that illustrates steps in a vulnerability exploitation—one that results in a malicious code being installed and run on a computer.

Techniques have been developed to allow runtime extensions to a whitelist that locks down a computational system. For example, in some embodiments, executable code (including, in some embodiments, objects such as a script or active content that may be treated as an executable) is not only subject to whitelist checks that allow (or deny) its execution, but is also subject to checks that determine whether a whitelisted executable is itself trusted to introduce further executable code into the computational system in which it is allowed to run. In general, deletion and/or modification of instances of code that are already covered by the whitelist should also be disallowed in accordance with a security policy. In such embodiments, an executable that is trusted may be allowed to delete and/or modify code instances covered by the whitelist. In general, trust may be coded for a given code instance that seeks to introduce, remove or modify code (e.g., in the whitelist itself) and at least some of the description herein focuses on trust encodings represented in whitelist entries that correspond to file system artifacts. Nonetheless, as also described herein, trust may convey from some other source.

Because, at any given time (subject to trusted change extensions), the set of executable code on a computational system is locked down, a security infrastructure may (but strictly speaking need not) interdict attempts by whitelisted code to make changes to introduce new executable code. Indeed, absent a corresponding extension to the whitelist, such new executable code will not be allowed to execute in the computational system. Accordingly, the description that follows details techniques by which a security infrastructure may selectively allow trusted executables to take the additional step of extending, or otherwise changing, the whitelist itself.

For concreteness, much of the description herein is presented in the illustrative context of operating systems, file systems and other software constructs and conventions typical of Microsoft Windows® type operating environments. Nonetheless, based on the description herein, persons of ordinary skill in the art will appreciate suitable adaptations for other operating environments, including those that employ UNIX- and/or Linux-type operating environments, virtualization technologies, etc. In view of the foregoing, and without limitation, we summarize certain illustrative embodiments.

In some embodiments, we begin with creation of a policy to secure the computational system. In some embodiments, an auto generated policy can be used to initially secure a system. For example, an autogen process may traverse a file system, open each file and, if file system permissions indicate that the file is executable, or if the file is treated as executable (e.g., as an MSI, MSP, MST file), we store the file size, name and/or path and an SHA1 hash of file contents as a whitelist entry. Note that other entry formats may be employed in other embodiments. After the traversal, the computational system is locked down subject to trusted changes described further herein. In this way, each executable file of a pristine configuration is whitelisted; however, subsequently introduced executables (even those installed by user with operating system administrator privileges) will simply not be allowed to execute absent a corresponding and authorized addition to the whitelist.

To enforce such a policy, we hook (or otherwise interpose on) file system operations (e.g., file open system calls). If an execute bit is set for the target of the file system operation (or if the target is an arbitrarily mapped file such as an MSI), we trap the operation and consult the whitelist. If the target code is not whitelisted, we prevent process startup. If it is whitelisted, we let it run and check to see if it is also trusted. We track the corresponding process through call sequences and track the processes with which it interacts including, e.g., those spawned and those invoked using an interprocess communication mechanism such as Microsoft's Distributed Component Object Model (DCOM). Thus, for each process, we track in a process table (typically independent of an operating system process table), trust conveyed through call sequences, process spawns and interprocess communications.

For trusted processes, we watch for file or directory I/O (e.g., writes, deletes, modifies) using any suitable interposition mechanism and trust items that a trusted process, including any process that inherits trust from a trusted MSI, introduces to protected storage including code introduced after reboot using pending rename mechanisms. Then, in correspondence with these trusted changes, we adjust, append-to or delete-from the whitelist to include appropriate and corresponding entries in the whitelist. Through all of this, and without relaxing system lockdown, we prevent code that is not whitelisted from executing, we prevent processes that are not trusted from gaining trust and we impede memory-based malicious code techniques, such as buffer overflows, from compromising the computational system.

In some embodiments, a method of managing a whitelist that at least partially governs operation of a computational system includes providing a computer readable encoding of the whitelist. The whitelist identifies (i) instances of code that are allowed to execute on the computational system and (ii) trust attributes therefor, wherein at least one of the trust attributes indicates, for a trusted one of the code instances, that a further code instance introduced into the computational system based on execution of the trusted code instance is to be added to the whitelist and thereby allowed to execute. Responsive to execution of a first code instance that at least initiates introduction of an executable second code instance into the computational system, the method checks the whitelist entry that corresponds to the first code instance and, based thereon, extends the whitelist to allow execution of the introduced second code instance only if the whitelist entry that corresponds to the first code instance includes a trust-changes-type protection attribute. The computational system executes only those code instances allowed by the whitelist.

In some embodiments, the whitelist identifies individual ones of the code instances and trust attributes therefor by correspondence with respective files in a file system. In some embodiments, relative to the first code instance, the whitelist encodes: a size of a first file in a file-system from which the first code instance is loaded into memory and executed; a name of the first file; a hash, a digital signature, authentication code, checksum, fingerprint or other cryptographic digest that verifies integrity of the first file; and a trust-changes protection attribute. In some embodiments, the whitelist further encodes a path to the first file, wherein the path is specified with or without wildcards. In some embodiments, relative to the first code instance, the whitelist encodes: a full path to the first file, specified with or without wildcards; and a trust-changes protection attribute.

In some embodiments, relative to the first code instance and in addition to the trust-changes protection attribute, the whitelist explicitly encodes additional protection attributes that when individually set/cleared, direct a kernel resident security feature to: allow/disallow read access to the first file; allow/disallow overwriting of the first file; allow/disallow loading of the first file into memory and execution thereof; and/or allow/disallow deletion of the first file from the file-system. In some embodiments, existence of a whitelist entry corresponding to the first code instance constitutes an allow-type execution entry therefor. In some embodiments, protection attributes including the trust-changes protection attribute are encoded independent of file-system permissions.

In some embodiments, relative to the second code instance, extension of the whitelist to allow execution of the introduced second code instance includes adding: an entry that encodes a size of a second file in the file-system from which the second code may be loaded into memory and executed; a name of the second file and a path thereto; and a hash, a digital signature, authentication code, checksum, fingerprint or other cryptographic digest usable to verify integrity of the second file.

In some embodiments, the method further includes interposing on file system operations and, as a condition precedent to execution of any particular code instance, determining that a corresponding allow-type entry appears in the whitelist. In general, interposing on file system operations may includes one or more of: hooking file system calls; hooking a function pointer table in an operating system kernel; and interposing a file filter driver.

In some embodiments, the method further includes maintaining in correspondence with call sequences of code executing on the computational system, a data structure that encodes for a given process, correspondence back to an operative entry of the whitelist. In some embodiments, the method further includes interposing on a write-type operation performed by either the first code instance or a third code instance executed based on a call sequence traceable to the first code instance; and as a condition precedent to allowing the interposed upon write-type operation to introduce into the computational system an executable file loadable as the second code instance, checking to ensure that a corresponding trust-changes protection attribute so allows. In some embodiments, the trust-changes-type protection attribute encoded in the whitelist in correspondence with the first code instance conveys effective trust for changes to the third code instance executed based on a call sequence traceable to the first code instance if each code instance along the call sequence has a corresponding allow-type entry in the whitelist.

In some embodiments, the method further includes tracking processes and call sequences thereof by interposing on file system operations and, at least with respect to those file system operations incident to a transfer of control to a third code instance, as a condition precedent to execution of the third code instance, determining that a corresponding allow-type entry appears in the whitelist.

In some embodiments, the first code instance executes as a trusted installer process and introduction of the second code instance into the computational system is performed by a service based on an interprocess communication from the trusted installer process. For example, in some embodiments, the first code instance is an MSIexec process the third code instance executes as a DCOM service. In some embodiments, the method further includes tracking interprocess communications between the first code instance operating as a trusted installer and a third code instance operating as a service shared amongst trusted and potentially un-trusted callers. The interprocess communications tracking may include interposing on interprocess communications initiated by the first code instance and capturing identifying indicia therefor; interposing on an operation of the third code instance to identify a particular invocation thereof that corresponds with a particular one of the identifying indicia captured for a particular one of the interprocess communications initiated by the first code instance; and based on an affirmative correspondence, propagating effective trust for changes made by the third code instance executed based on the particular interprocess communication traceable to the first code instance.

In some embodiments, a fourth code instance is not itself executable, but rather is a script or other source for the first code instance which, in turn, constitutes an interpreter, scripting engine or other host therefore. Accordingly, the introduction of the second code instance into the computational system is performed by the interpreter, scripting engine or other host based on contents of the fourth code instance. In such embodiments, the method may further include interposing on an operation of the first code instance to capture a file-system identifier for the fourth code instance; and determining whether a whitelist entry that corresponds to the fourth code instance includes the trust-changes-type protection attribute and, if so, propagating effective trust for changes made by the first code instance, including the introduction of the second code instance into the computational system, while the fourth code instance defines an execution context for the first code instance. In some such embodiments, the first code instance is a Perl or Windows scripting engine o a shell process, and the fourth code instance is a Perl or Visual Basic script or a command file.

In some embodiments, the executable second code instance may constitute a replacement for a code instance executing in the computational system, and the method then further includes, responsive to either or both of (i) storage of the second code instance to a protected file system using a temporary identifier and (ii) storage of the temporary identifier in a location used by the computational system to initiate later completion of an install, interposing on operation of the install completion and in correspondence with replacement of the previously executing code instance with the second code instance, performing the extension of the whitelist to allow execution of the now introduced second code instance in the computational system. The location may be used by the computational system to initiate later completion of an install is a pending rename registry key. In some embodiments, a code instance that implements the install completion in the whitelist is included in the whitelist.

In some further embodiments, the first code instance also introduces an uninstaller code instance into the computational system, wherein the uninstaller code instance corresponds to, and upon execution attempts to uninstall, the second code instance. Accordingly, the method may further include interposing on a write-type operation of the first code instance that targets a location used by the computational system to identify uninstaller code; and extending the whitelist to allow execution of the uninstaller code instance and setting a corresponding trust-changes-type protection attribute to allow both later execution of the uninstaller code and modification of the whitelist in correspondence with the uninstall.

In some embodiments, the method further includes, responsive to execution of a first code instance that seeks to remove an executable sixth code instance from the computational system, checking the whitelist entry that corresponds to the first code instance and, based thereon, removing from the whitelist an allow-type entry corresponding to the sixth code instance only if the whitelist entry that corresponds to the first code instance includes a trust-changes-type protection attribute.

In some embodiments, the method includes interdicting execution of code instances not identified by the whitelist. In some embodiments, the method includes automatically generating a base version of the whitelist based on a set of files that have an associated file-system-based protection attribute set; and representing extensions, modifications and deletions to the whitelist as delta-coded changes to the base version. In general, the whitelist may cover one or more protected stores, including a file system.

DESCRIPTION

What are needed, and what are described herein, are solutions that are secure, but which also allow carefully guarded, managed, and (in some cases) reversible changes to occur on secured systems. This process, together with the software mechanisms that so provide, is referred to herein as "Trusted Change." Typically, trusted change processes begin with a careful definition or selection in a trusted change policy of those entities (e.g., executables or groups/classes thereof, network shares, users or groups of users, computational systems, etc.) that are trusted by security software to make changes. Based on the trusted change policy, attempts to execute code that seek to modify a protected state are evaluated and selectively allowed and disallowed. In general, states protected by a trusted change policy can include those encoded in, or as, executable files, registry data, system configuration data, network access, permissions, etc. An allowed modification to a protected state correspondingly extends an overall security policy. In this way, an extended definition of "secured" can be provisionally, and sometimes permanently, reflected in the security policy that defines and protects an endpoint computer system. In some implementations, provisionally applied extensions are subject to review, approval and possible reversal by a system administrator.

Challenges and Approaches

The tension between secure control of a system and flexibility of a system is well documented. Organizations and products abound providing configuration control, patch management and secure updating. Yet none of these approaches has eliminated the risk of malware corrupting or controlling a computer system. In 2007, Microsoft in its Security Intelligence Report, indicated that its Malicious Software Removal Tool alone had removed 50 million infections in the prior 2 years.

Indeed, in just the first half of 2007, hundreds of thousands of malware variants were detected in the numerous families of known malware. Traditional anti-malware solutions that are premised upon blacklisting must constantly update their blacklist databases to keep track of these new variants. Blacklisting solutions provide a secure update mechanism for maintaining these lists; however, it is a continuing challenge, with malware developers releasing new variants faster than blacklist databases can be maintained. The blacklisting mechanism, by its nature, means the system has a window of vulnerability between the identification of a variant or new malware family and the secure update of the blacklist database. A variety of factors can affect the update process including, configuration parameters of the update, lack of availability of the master updater, and lack of reliable network connectivity. In addition, as blacklist databases increase in size and complexity, performance on the protected system suffers. Fundamentally, blacklist based solutions rely upon the secure update mechanism as their method for implementing trusted change. As discussed above, gaps created by the time between variant discovery and blacklist update exist, as well as gaps that may be created during unavailability of the update mechanism or update source. These gaps make blacklisting secure update mechanisms less effective for system protection than the proposed methods of trusted change.

Configuration Management (CM) is one of the traditional approaches to controlling software additions and removals on a system. Configuration Management works by establishing a baseline of the software used on a system and then keeping track of the revisions as they are added. However, CM does nothing to prevent malware from attaching to a system. CM is concerned only with the state of the software components is controls and updates. CM has no capability to prevent additional software from being loaded by another program or a user, whether authorized or unauthorized. A CM does not understand the trust level or risk level of the system, and therefore does not provide a trusted change mechanism for all the software that runs on a system. CM systems typically run in a scheduled fashion. Scheduling may be recurring or ad hoc, but once a CM program has run, it has no ongoing relationship with the system under management until the next scheduling occurs.

Patch Management (PM) is even more limited in terms of its ability to participate in trusted change. PM is concerned with ensuring a new addition to an existing program is needed, that the program is maintained according to policies, and furthermore, that a patch update will not degrade operational efficiency. PM programs do nothing to prevent unauthorized software and malware from installing; rather they focus on keeping software up to date in terms of features and bug fixes, including fixes for software vulnerabilities. PM systems typically run in a scheduled fashion. Scheduling may be recurring or ad hoc, but once a PM program has run, it has no ongoing relationship with the system under management until the next scheduling occurs.

Older security mechanisms for controlling application proliferation, such as Mandatory Access Control (MAC) have failed as solutions for securing general purpose systems. Most security professionals regard MAC as a strong mechanism for protecting systems. However, a lack of flexibility has precluded wide scale adoption outside classified government applications. An extension to MAC based on a new more flexible mechanism, information labels, was proposed in the context of Compartmented Mode Workstations (CMW) designs. Unfortunately, CMW designs did not achieve balance between control and flexibility and were never a commercial success. While Sun Microsystems has provided a version of Solaris™ operating system which includes features such as an information label database, the implementation was unwieldy and the set of labels tended grow out without bound. Finally, traditional desktop applications, such as publishing, spreadsheets, and electronic mail, have not operated well with the trust model imposed by MAC and CMW enforcement mechanisms.

Policy-Based Whitelisting Implementations, Generally

At its most basic, the function of a computer is to access storage, run applications, and interact across a network. When a computer is first set up to perform these functions, it runs just fine. Why? Mainly because it has been tested to some degree to make sure all the software works together and it was set up by a knowledgeable person, usually an officially sanctioned IT administrator. In the case of systems delivered from a manufacturer, the images that were loaded at the factory were initially tested and run through quality assurance. However, over time the computer begins to experience problems due to unknown and unauthorized changes to the computer's software. These unauthorized changes can be the result of a malware download, a vulnerability exploitation from across the network, or even a detrimental change by the computer user.

Numerous security and anti-malware system offerings from numerous vendors seek to prevent these types of unauthorized changes from occurring, whether through blacklist-type or whitelist-type techniques. One example of a system that employs "application whitelisting" techniques, is that available from CoreTrace Corporation as the BOUNCER BY CORETRACE™ solution. In general, trusted change techniques described herein will be understood in the context of facilities, design choices, configurations, terminology and allocations of functionality typical of the Bouncer by CoreTrace solution. Therefore, for concreteness though without limitation, we briefly describe certain illustrative aspects of the Bouncer by CoreTrace solution. CORETRACE and BOUNCER BY CORETRACE are trademarks of CoreTrace Corporation.

Likewise, persons of ordinary skill in the art will understand trusted change techniques described herein in the context of facilities, terminology and exploits typical of certain commercially-available processor architectures, operating systems, systems and network protocols and/or services. For example, conventional processor and operating system features, mechanisms and constructs typical of microprocessors and software available from Intel Corporation, Sun Microsystems and Microsoft Corporation provide a useful descriptive context for our techniques. That said, embodiments of the present invention are general to a wide variety of processor and system architectures (architectures based on any of a variety of instruction set architectures), to virtualizations thereof and to numerous operating system implementations as well as to computations that need not include, or be coordinated by, a conventional operating system.

Accordingly, in view of the foregoing and without limitation on the range of underlying security solutions, processor, hardware or system architectures; operating systems; or virtualization techniques that may be employed in embodiments of the present invention, based on these embodiments, and on the claims that follow, persons of ordinary skill in the art will appreciate a broad range of suitable implementations and embodiments.

The Security Problem

Leaving aside desired software changes made by a system administrator or local user, there are three major technical objectives to exploiting a computer system and they each ultimately involve unauthorized software or configuration changes. The first and, by far, most common objective of malware is to introduce a new piece of software into storage from which it can eventually be executed. This goal can be accomplished via escalation of privileges on the computer allowing the direct copying of the file, by exploitation of a vulnerability in the operating system or in an application, by operation of code (e.g., a virus, worm, trojan, bot or other malware) previously introduced, and so forth.

FIG. 1 illustrates steps in a simplified illustration of exploitation of an application vulnerability—one that results in malware being introduced to storage and potentially executed on a target computer. In the illustration, the vulnerable application is a portable document format (PDF) reader application 111; however, more generally, a vulnerable instance of any application such as a web browser, word processor, spreadsheet program, etc. that accesses content may be involved in the transmission vector. In the illustration, PDF reader application 111 executes on computer 110 and, at some point loads PDF content 121 from a web server 120 (or from some other source). Although it is typically unrecognized by the user of computer 110, PDF content 121 may include an exploit (e.g., code, data or other information) that exploits vulnerability in PDF reader application 111 to perform actions that further the malware's objective. In the illustration of FIG. 1, a vulnerability in PDF reader application 111 allows the exploit to open an ftp connection to server 130 that acts as a source of malicious code 131. In general, server 130 may be a repository specifically provided to host the malicious code or may be some other computer that has been previously compromised and acts as a transmission vector. An advantage of strategies such as illustrated in FIG. 1, at least from the malware's perspective, is that there are numerous avenues to introduce the malicious code into storage accessible to the target (here, computer 110). In general, the software is easy to write and directly accomplishes the hacker's objective. As a practical matter, the hacker can often place the malicious code in, and subsequently execute from, any of a variety of storage accessible to the computer 110.

In other somewhat less common scenarios, malware can make a deeper, stealthier level of penetration into the computer system. For example, the exploitation vector may be the same vulnerability or privilege escalation, but instead of a new piece of software introduced, an existing application (or portion thereof) may be overwritten, i.e., trojanized, or worse yet a legitimate file in the operating system may be replaced resulting in a 'rootkitted' system. Depending upon the sophistication of the attacker and the rootkit installed, the system may or may not continue to function properly. More importantly, the rogue software now masquerades as legitimate code which can covertly exploit the system. Still other malware objectives for exploiting a computer need not directly impact the existing software configuration. Instead, the hacker may modify the configuration of software running in memory. Again, the exploitation vectors can be the same, but rather than copying a file to disk or other storage from which it can be subsequently loaded, the payload is a software program loaded directly into memory.

Security technologies have traditionally focused on minimizing the exploitation vector, e.g., by patching vulnerabilities, providing better access control mechanisms, etc. and identifying the payload, e.g., by matching known signatures for viruses, malware, and so forth. The challenge has always been managing and maintaining these technologies in a timely fashion. It is a never ending cycle of patching vulnerabilities, downloading the latest anti-virus/anti-malware signature files, penetration testing to make sure fix is effectively loaded, and on and on. Ultimately, the security breach occurs in the window of time between the announcement of the fix and when it gets implemented on all systems—the 'zero hour' vulnerability period.

Whitelist-Based Security Infrastructure

Techniques described herein are the product of a long, hard look at this vicious cycle and seek to operationalize the often made (but difficult to keep) resolution to maintain the integrity of a clean system. Rather than solely look for what is wrong on a system, the technique(s) described herein build from a situation in which the initial installation and setup was correct and create mechanisms to lock it in that configuration. After careful consideration and experimentation, we have developed techniques and mechanisms that facilitate practical use of "application whitelisting" techniques to address information system security challenges. These techniques and mechanisms will be understood in the context of an illustrative security infrastructure now described with reference to FIG. 2. Often, a whitelist of known files can be created from the clean initial state of the computer itself. Then, as a baseline proposition, executable files not included in the whitelist are not allowed to run from the hard drive or other storage, regardless of how they got there.

Using this approach, malware's first exploitation objective, loading unauthorized software on the computer, is impeded. For example, in an illustrative application whitelisting application, the whitelist covers all executables (including application and operating system files) on the computer and prevents overwriting or replacing them. As a result, malware's second exploitation objective, trojanizing or rootkitting a system, is also impeded. Finally, only known applications from the whitelist are allowed to load into memory, thereby preventing most memory configuration changes. If a process is detected for which the corresponding executable is not whitelisted, it is stopped. Therefore, in addition to stopping these types of active exploits, the described whitelist solution provides immediate 'zero hour' protection because no unauthorized software can run.

Figure 2:
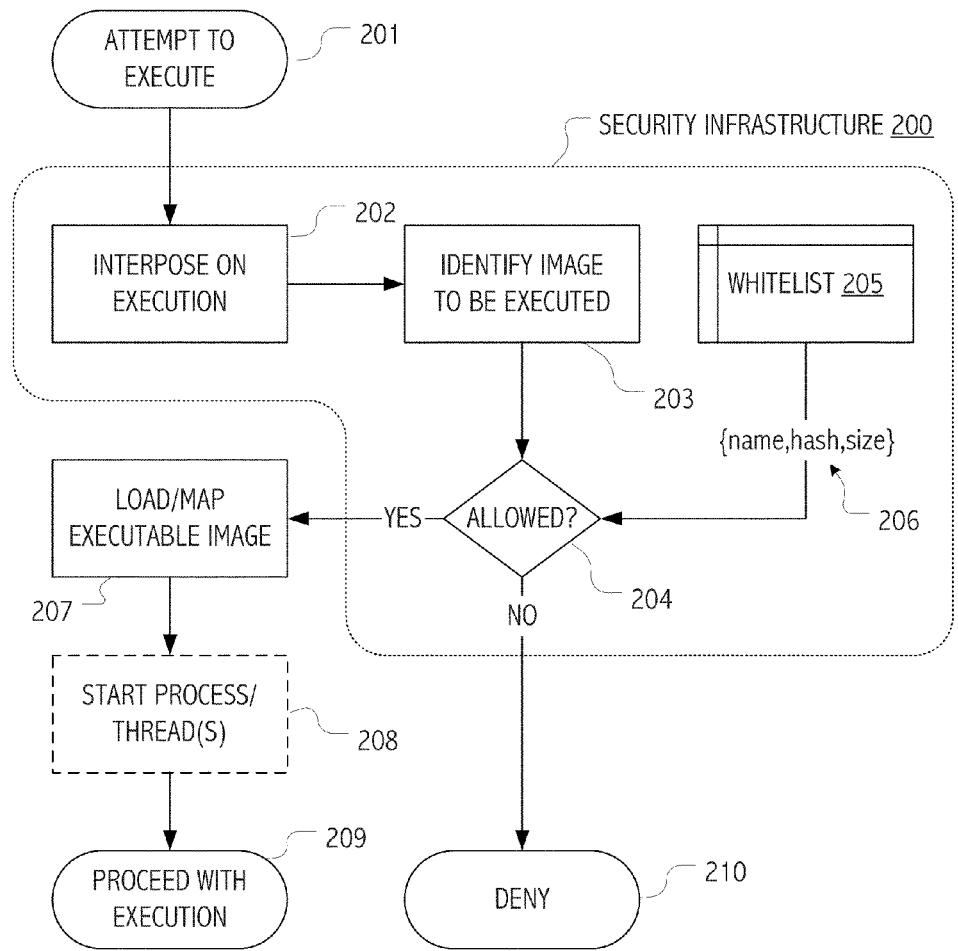
FIG. 2 is a flow diagram that depicts selected operational aspects of a security infrastructure in accordance with some embodiments of the present invention, which interposes on execution of a code instance and employs a whitelist to determine whether or not to allow execution of the code instance.

FIG. 2 is a flow diagram that depicts selected operational aspects of a security infrastructure 200 that interposes (202) on execution of an instance of code and that employs a whitelist to determine whether or not to allow execution of the code instance in a computational system. Interposition is a technique that may be employed at any of a variety of points in the operation of computational system and, based on the description herein, persons of ordinary skill in the art will appreciate a wide variety of interposition techniques that may be employed to achieve the ends described herein. Nonetheless, for concreteness of description, much of the description herein focuses on interposition on file system operations which are typically performed by or in coordination with facilities of an operating system, such as software from the Windows® family of operating systems available from Microsoft Corporation. In at least some implementations of these operating systems, opportunities exist for interposition upon a file system operation (typically a load- or open-type operation) by which a particular executable image in storage is introduced into (or otherwise associated with) memory locations from which it can then be executed. For example, hooking file system calls, hooking a function pointer table in an operating system kernel and/or interposing a file filter driver are all techniques that may be employed to "intercept" activity that occurs in the operating system prior to execution of a particular code image and thereby interpose on the execution.

Typically, the computational system is a computer (not separately shown) with an operating system or other supervisory software executing thereon. Often such an operating or supervisory system exposes facilities and interfaces to user mode code, while protecting facilities, resources and interfaces of a kernel. In some cases, a virtualization system or hypervisor may expose or emulate a virtual computer and an instance of an operating system may (in effect) execute on the "computer" so virtualized. In some cases, an operating system may itself provide virtualization support or a virtualization system may itself host executable code without involvement of an operating system per se. Furthermore, persons of ordinary skill in the art will recognize that virtualization techniques may expand the opportunities for intercepting operations that precede an incipient execution of a code image. For example, in some virtualization systems, selective binary translation techniques and/or memory management techniques may be employed at runtime to facilitate interposition behind a virtualization barrier.

Recognizing the foregoing, but in an effort to provide a concrete description of certain illustrative embodiments, the description herein emphasizes interposition techniques generally suitable for use in typical operating system mediated execution of a computer (whether or not virtualized) and indeed, builds upon facilities and terminology typical of conventional Windows® type operating systems. Nonetheless, based on the description herein, persons of ordinary skill in the art will appreciate numerous variations, modifications and/or extensions for other operating system, executive and/or virtualization system implementations.

In view of the foregoing and without limitation, FIG. 2 illustrates operational aspects typical of certain illustrative embodiments of an application whitelisting security infrastructure. More particularly, upon an attempt (201) to execute a particular instance of code in a computational system, security infrastructure 200 employs (202) one or more interposition techniques to detect the attempt and to thereby facilitate identification (203) of the particular code image to be executed. In general, identification may be based on any of a variety of factors; however, in the illustrated scenario, a 3-tuple {name, hash, size} of elements available or ascertainable within the execution context of interposed upon file system operations identifies an executable image for purposes of whitelisting. For example, in some implementations, executables are identified using a multiple element descriptor that includes:

name: location of the file in storage, e.g., path and file name;
size: size of the file; and
hash: a digital digest, such as using an SHA1 algorithm, that provides a unique fingerprint for the file.

The name (typically a filename with or without a full or partial path) will be used in the interposed upon operation(s) that attempt(s) to load, map or otherwise identify a particular code image for execution. That name, together with additional information ascertainable based thereon such as a size and a hash of content of the identified file or object, may be used for runtime check (204) against contents of a whitelist 205, which encodes tuples, e.g., {name, hash, size}, for executables that are allowed to execute in the computational system.

As explained herein, the illustrated 3-tuple {name, hash, size} is generally robust to tampering. If the name obtained by interposing on the attempted execution, the size of the image so identified and a hash which can be computed over the identified image all match corresponding fields 206 of an allow-type entry from whitelist 205, then security infrastructure 200 allows the interposed upon execution to proceed and the image is loaded (207) or mapped to memory for execution. In some cases, a new process or thread of execution will be created (208) or, in some execution environments, forked or spawned, and, in any case, execution of the code allowed by the allow-type entry of whitelist 205 proceeds (209) normally. If the name obtained by interposing on the attempted execution, the size of the image so identified or the hash computed over the identified image do not match corresponding fields 206 of an allow-type entry from whitelist 205, then security infrastructure 200 denies (210) execution of the corresponding code image. Depending on the implemented security policy, any of a variety of additional actions (e.g., logging, marking the executable suspect, etc.) may be performed.

Although operation of illustrative security infrastructure 200 has been described relative to particular elements of a 3-tuple allow-type whitelist entry, other codings and fields may be provided in other embodiments. By utilizing the described elements {name, hash, size} or similar elements, it is generally possible to ensure that file for which an allow-type entry has been coded has not been tampered with or modified and (in some embodiments) to further test corresponding object loaded into memory to ensure it has not been changed 'on the fly.' In this regard, it is notable that there are tools commonly available to hackers that take a file, allow injection of exploit code, and then pad the file to produce the original digest from the SHA algorithm. However, these changes are generally at the expense of the file size. Accordingly, by including size (or some other attribute that is sensitive to such perturbations) in the allow-type whitelist entry, the above-described techniques allow modification (of the original whitelisted code) to be detected by security infrastructure 200. Other cryptographic security mechanisms may be employed if desired.

Some implementations may maintain a database of size and digest information created from vendors' original media that can be compared (or used in conjunction) with the whitelist created from the computer itself. However, other implementations may omit (and/or not rely upon) vendor-sourced whitelist data. In general, while vendor-sourced data may provide some sense of security for known file matches, such data does not address unknown or undocumented executables. Furthermore, even for applications that might be covered by vendor-sourced data, updates are constantly being released, and corresponding updates to vendor-sourced data would have to be entered in the database and cross-referenced (or otherwise reconciled) against particular versions operant on a particular computer. Many organizations have legacy or internally developed applications and others may run software that is not part of the database. Accordingly a purely vendor-sourced model for whitelist data tends to suffer from many of the same shortcomings found in the blacklist antivirus model, with organizations having trouble of keeping it current.

In short, the reality of maintaining an exhaustive and current database list can be overwhelming even for a sophisticated enterprise. Another potential weakness of a pure vendor-sourced model for whitelist data is simple database corruption. It is possible to include a Trojanized file in the database that will be overlooked and even authorized as part of the trusted software on computers. Accordingly, although some embodiments may incorporate suitable vendor sourced data (if available), techniques described herein generally assume that such data is either incomplete or may be untrustworthy. As a result, the exemplary embodiments described herein do not require vendor sourced data for security-oriented functions.

Security Infrastructure for Trusted Change

Building on the foregoing, persons of ordinary skill in the art will appreciate that, while powerful, the basic whitelisting framework described above is based on a largely fixed security policy. A properly authorized administrator may update the policy, including whitelist components thereof; however, execution of code not identified in the current whitelist is generally disallowed. The goal of a trusted change facility is to allow systems to simultaneously be secure, maintained, and (optionally) user-serviceable where such flexibility is warranted. For example, in a computational system that employs a whitelist-type security policy, trusted change mechanisms can allow non-administrators to perform certain updates to protected system states and to (at least provisionally) add newly installed, configured or updated executables to a set of executables allowed by the whitelist.

Figure 3:
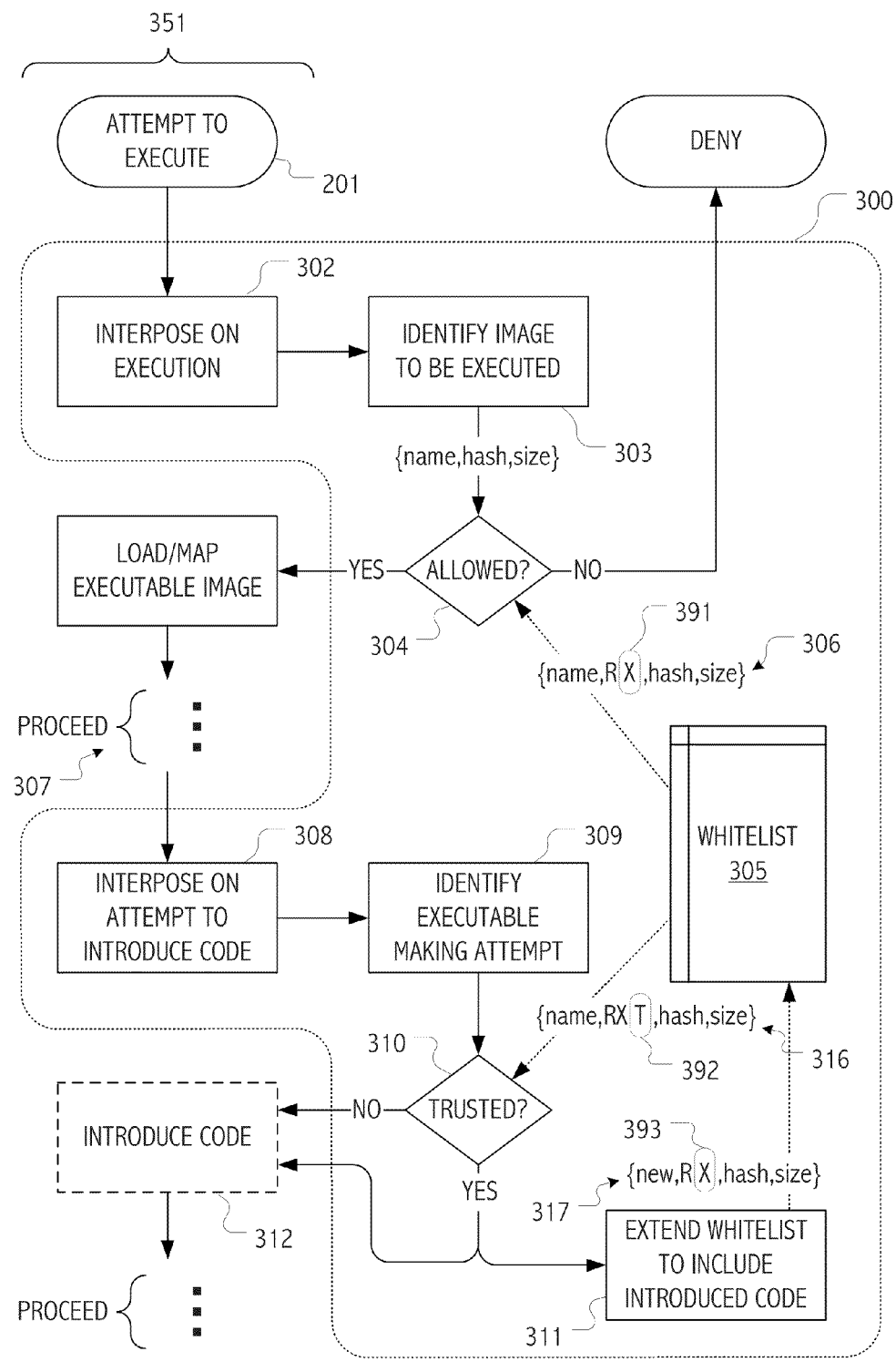
FIG. 3 is a flow diagram that depicts selected operational aspects of a security infrastructure that, in accordance with some embodiments of the present invention, allows certain trusted code instances to introduce code into a computational system and to correspondingly extend an operant whitelist to allow subsequent execution of the introduced code.

FIG. 3 is a flow diagram that depicts selected operational aspects of a security infrastructure 300 that, in accordance with some embodiments of the present invention, allows certain trusted code instances to introduce code into a computational system and to correspondingly extend an operant whitelist to allow subsequent execution of the introduced code. Security infrastructure 300 extends the application whitelisting features introduced in FIG. 2 and will be understood based on the preceding description. As before, upon an attempt (201) to execute a particular instance of code in a computational system, the security infrastructure (here security infrastructure 300) employs (302) one or more interposition techniques to detect the attempt and to thereby facilitate identification (303) of the particular code image to be executed. Also as before, a 3-tuple, {name, hash, size} of elements available or ascertainable from the execution context of the interposed upon file system operation is compared against corresponding fields of an allow-type entry from whitelist 305 and, based on results of the comparison, the executable is either (i) allowed to load into or map (307) to memory and proceed with execution or (ii) denied.

In the illustration of FIG. 3, fields of entries of whitelist 305 (including e.g., fields of entry 306 which correspond to the interposed upon and identified executable) have been augmented to encode specific protection attributes. Whereas the illustration of FIG. 2 simplified operations by assuming that mere presence of an entry constituted an allow-type entry, a more granular coding of protection attributes may be employed in some embodiments. For example, FIG. 3 illustrates trusted-change operations relative to one such granular encoding in which read (R), execute (X) and trust-changes (T) protection attributes are illustrated. Thus, in the illustrated configuration, the execute (X) protection attribute 391 indicates that an executable named name (or appearing at a fully or partially specified path name, e.g., with or without wildcards) for which an SHA1 hash and size can be matched against fields of a corresponding entry of whitelist 305 may be executed.

In some embodiments, entries of whitelist 305 explicitly encode one or more protection attributes that when individually set/cleared, direct a kernel resident security checks of security infrastructure 300 to:
- allow (R) or disallow (not R) read access to the corresponding executable;
- allow (W) or disallow (not W) overwriting of the corresponding executable;
- allow (X) or disallow (not X) loading of the corresponding executable into memory and execution thereof; and/or
- allow (D) or disallow (not D) deletion of the corresponding executable from the file-system.

Of course, in some embodiments, additional, different or lesser variations and/or alternative codings or semantics for protection attributes may be supported in accord with particular design goals or constraints.

Assuming that, in accordance with contents of whitelist 305, security infrastructure 300 allows the executable image associated with the filename/path name to execute, execution of that image (or some successive image for which execution is similarly allowed in execution sequence 351) may proceed (307) to a point at which the image attempts to introduce code into storage of the computational system. Once again, security infrastructure 300 interposes upon a file system operation. Here, security infrastructure 300 interposes (308) on an attempt to introduce an instance of code into the computational system. The security infrastructure employs one or more interposition techniques (e.g., hooking a file system call, hooking a function pointer table entry, interposing a file filter driver, etc.) to detect the attempt and to thereby facilitate identification (309) of the particular code image making the attempt. Although any of a variety of file system operations may be interposed upon, in some embodiments, interposing on a file create operation, a file open for write operation, or the like provides an appropriate intervention point at which security infrastructure 300 may identify (309) the executing image and validate the attempt against whitelist information.

Note that, in some embodiments, such as those in accord with FIG. 3, contents of whitelist 305 may simply be checked for an entry (e.g., entry 316) that corresponds to the executing image. If the image making the attempt is that previously allowed (at 304), entries 316 and 306 may be same entry. On the other hand, if the image making the attempt is a successor (e.g., by call sequence, process fork, etc.) or is otherwise related, then entries 316 may correspond to that successor or related image. Note that, in some embodiments, such as described in greater detail with reference to FIG. 4, a process tracking facility or cache may be employed to propagate protection attributes through call sequences, process forks, execution of related processes and/or threads etc. For clarity of illustration, we first describe embodiments in accord with FIG. 3.

In view of the foregoing, FIG. 3 illustrates a check (310) against entry 316, whereby security infrastructure 300 determines whether a trust-changes (T) protection attribute is set for the identified image attempting to introduce code into the computational system. As before, hash and size fields are employed to improve robustness of the determination. Thus, in the illustrated configuration, the trust-changes (T) protection attribute 392 indicates that an executing image associated with the filename name (or appearing at a fully or partially specified path name, with or without wildcards) is trusted to make changes and if an SHA1 hash and size for the image can be matched against fields of a corresponding entry of whitelist 305.

In view of the whitelisting techniques employed by security infrastructure 300, it will be apparent that a new executable will actually be allowed to execute within the computation system only if a corresponding allow-type entry appears in whitelist 305. Accordingly, in the illustrated embodiment, security infrastructure 300 extends (311) whitelist 305 by adding a new entry 317 for the executable image being introduced into the computational system as a trusted change. More specifically, added entry 317 codes an allow execute (X) protection attribute 393 and specifies that an executable image associated with the filename new (or appearing at a fully or partially specified path new, with or without wildcards) is allowed to execute if an SHA1 hash and size for the image can be matched. Prior to, after or generally coincident with the whitelist extension (311), execution of the previously interposed upon code introduces (312) the new code.

Note that security infrastructure 300 ascertains the specific filename (or path) new from the execution context of the interposed upon code, typically as an operand of the interposed upon file system operation (e.g., as an operand of a file create operation, a file open for write operation, or the like). Because execution of an individual code image is governed by whitelist 305, it is typically not necessary to interdict introduction (312) of the new code, even if the attempting executable is not trusted. An executable introduced into storage of the computational system will be allowed to execute only if a corresponding allow-type entry appears in the whitelist (e.g., coded as an allow execute (X) protection attribute). Absent a trust-changes (T) protection attribute for the introducing code, no allow-type entry is created for the newly introduced code. As a result, new code introduced by existing code that is allowed to execute, but not trusted to make changes, will fail whitelist checks if execution is later attempted. Of course, additional interdiction capabilities may be provided if desired.

Process Tracking Variations

Figure 4:
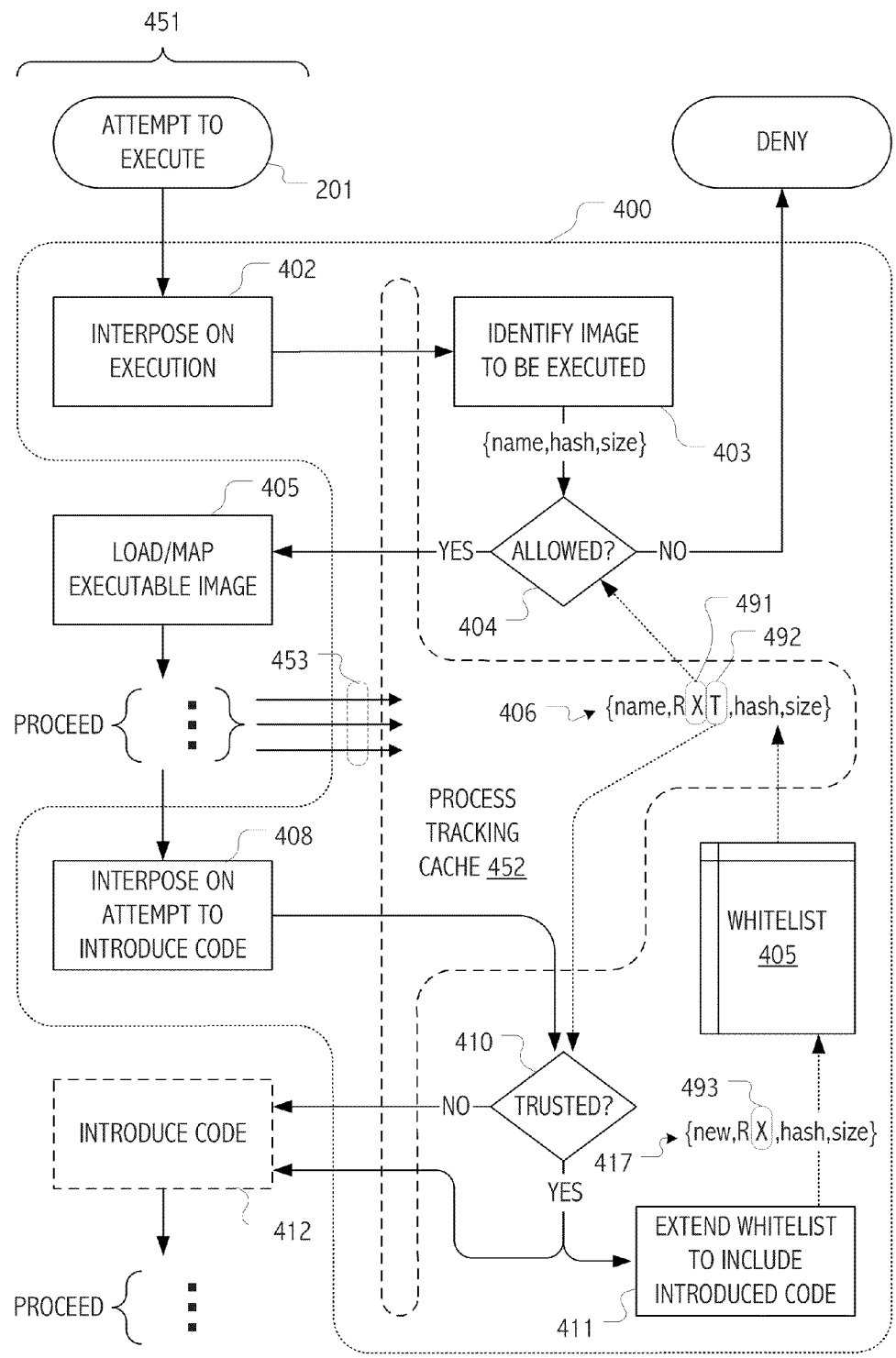
FIG. 4 is a variation on an embodiment depicted in FIG. 3, wherein a process tracking cache is used to propagate trust attributes though call sequences and to facilitate trust checks involved in the introduction of code into a computational system and corresponding extensions of an operant whitelist to allow subsequent execution of the introduced code.

FIG. 4 is a variation on the configuration depicted in FIG. 3, wherein a process tracking cache 452 is (i) used to track related processes, threads and/or dlls, etc. and (ii) to propagate protection attributes though call sequences, process forks, execs and/or spawns, etc. The process tracking cache is described in greater detail below but, relative to some embodiments of the present invention, can be used to facilitate trust checks involved in the introduction of code into a computational system. In general, process tracking cache 452 maintains information (e.g., handles, descriptors, pathnames, bindings, etc.) by which interposition techniques described herein may recognize pertinent process, thread and file system operations and track associated threads, dynamically linked libraries (dlls), etc.

Process tracking cache 452 also propagates (as appropriate) protection attributes associated with a particular code image executing as a process (together with referenced dlls) on to additional processes called, spawned or forked as part of execution sequence 451. In many computational systems, such processes may themselves include one or more threads of execution. Process tracking cache 452 both caches information from whitelist 405 and facilitates resolution of protection attribute checks (e.g., allowed check 404 and trusted check 410) against appropriate whitelist information even for executions that inherit their protection attributes as a thread of execution or through calls, forks, execs and/or spawns along execution sequence 451.

Security infrastructure 400 extends the application whitelisting features introduced in FIGS. 2 and 3 and will be understood based on the preceding description. As before, upon an attempt (201) to execute a particular instance of code in a computational system, the security infrastructure (here security infrastructure 400) employs (402) one or more interposition techniques to detect the attempt and to thereby facilitate identification (403) of the particular code image to be executed. The 3-tuple, {name, hash, size} of elements available or ascertainable from the execution context of the interposed upon file system operation compared against corresponding fields of an allow-type entry from whitelist 405. In the illustrated example, process tracking cache 452 facilitates the comparison based on information presented as entry 406 (which includes encoded read (R), execute (X) and trust-changes (T) protection attributes). As before, based on results of the comparison, the executable is either (i) allowed to load into or map (407) to memory and proceed with execution or (ii) denied.

In accordance with the illustrated contents of entry 406, security infrastructure 400 allows an image associated (either directly or indirectly) with the filename/path name to load (405) and to execute. As suggested above relative to description of process tracking cache 452, the image that is allowed to execute may be that which appears in the file system at filename/path name (with confirmed hash and size attributes) or may be one that follows (by call, fork, exec, spawn or the like) in execution sequence 451. In each case, the image so allowed may correspond as an associated thread or dll. Flows 453 are indicative of successive images (and interpositions on execution thereof) for which determinative attributes from an operant whitelist entry (e.g., entry 406) are propagated by operation of process tracking cache 452.

Execution proceeds to a point at which the image attempts to introduce code into storage of the computational system. Once again, the security infrastructure interposes (408) on the attempt. The security infrastructure again employs one or more interposition techniques (e.g., hooking a file system call, hooking a function pointer table entry, interposing a file filter driver, etc.) to detect the attempt and based on whitelist information conveyed via process tracking cache 452. As before, any of a variety of operations may be interposed upon, including in some embodiments, a file create operation, a file open for write operation, or the like. Using the protection attributes propagated using process tracking cache 452 and, in particular, based (in the illustrated scenario) on the trust-changes (T) protection attribute 492 of entry 406, security infrastructure 400 determines (410) that the attempt is by a trusted code image.

Because the file system target (here, file/pathname new) of the attempt is ascertainable from the context of the interposed upon execution, security infrastructure 400 is in a position to extend the whitelist to include an entry for the code introduced by execution of the trusted code. Accordingly, in the illustrated embodiment, security infrastructure 400 extends (411) whitelist 405 by adding a new entry 417 for the executable image being introduced into the computational system as a trusted change. More specifically, added entry 417 codes an allow execute (X) protection attribute 493 and specifies that an executable image associated with the filename new (or appearing at a fully or partially specified path new, with or without wildcards) is allowed to execute if an SHA1 hash and size for the image can be matched. Prior to, after or generally coincident with the whitelist extension (411), execution of the previously interposed upon code actually introduces (412) the new code.

As before, because execution of an individual code image is governed by whitelist 405, it is typically not necessary to interdict introduction (412) of the new code, even if the attempting executable is not trusted. An executable introduced into storage of the computational system will be allowed to execute only if a corresponding allow-type entry appears in the whitelist (e.g., coded as an allow-execute (X) protection attribute). Absent a trust-changes (T) protection attribute 492 associable with the introducing code (e.g., by operation of 452), no allow-type entry is created for the newly introduced code. As a result, new code introduced by existing code that is allowed to execute, but not trusted to make changes, will fail whitelist checks if execution is later attempted. Of course, additional interdiction capabilities may be provided if desired.

Figure 5:
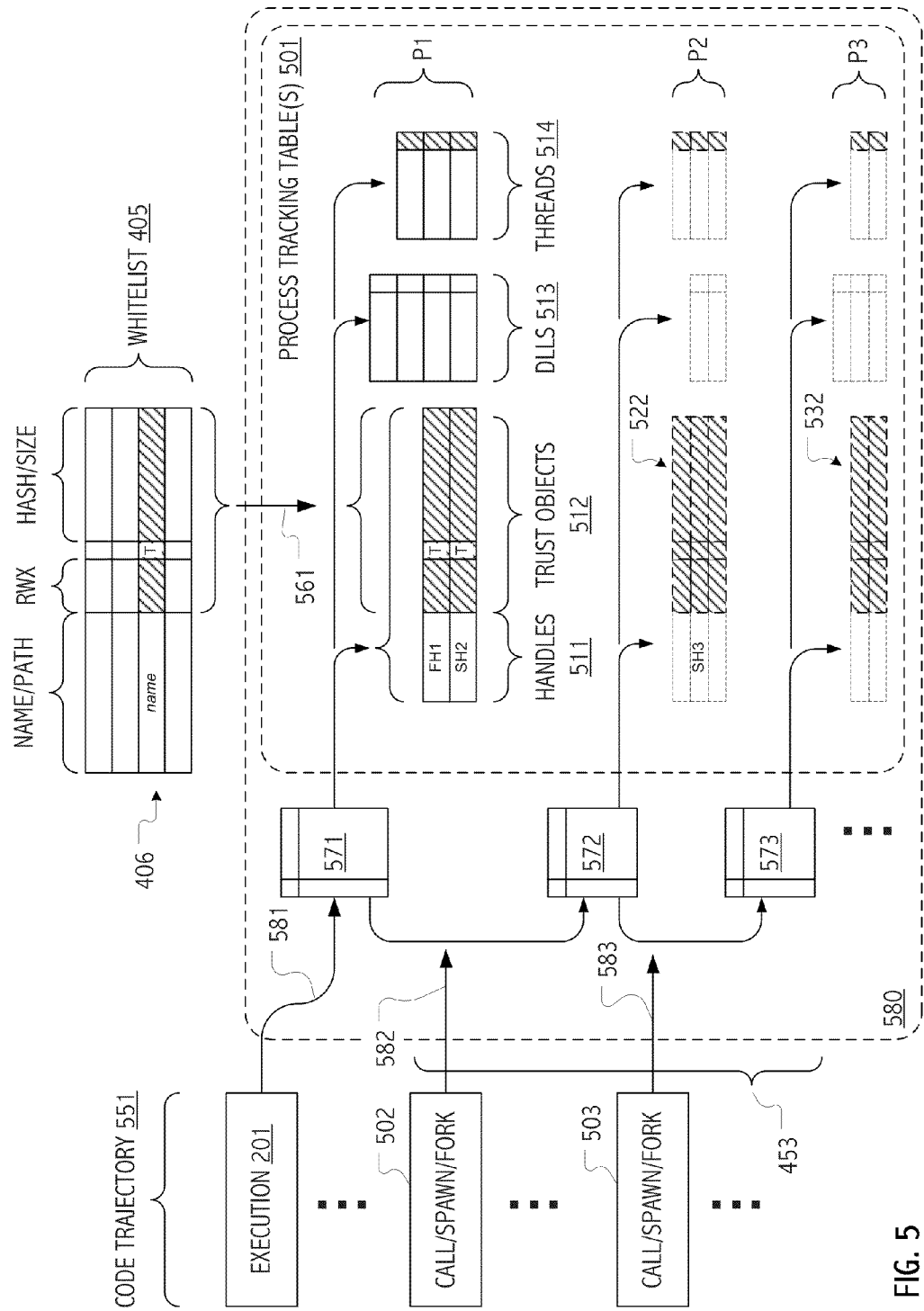
FIG. 5 illustrates propagation of trust attributes from a whitelist entry to execution processes and/or threads through successive software component invocations, e.g., via call, spawn and/or fork/exec mechanisms, in accordance with some embodiments of the present invention and using facilities of a process tracking cache.

FIG. 5 illustrates techniques and related process tracking table states in accordance with some embodiments of the present invention whereby protection attributes from an entry of a whitelist are propagated in correspondence with successive code invocations, e.g., through calls, spawns and/or fork/exec type mechanisms, of code trajectory 551. The illustrated techniques and process tracking table states correspond to operations performed in some embodiments of process tracking cache 452 and in accord with whitelist-type decisioning such as described above. In particular, entry 406 of whitelist 405 corresponds to execution (attempted at 201 and eventually allowed at 404, recall FIG. 4) of an image identified using file/pathname name (with confirmed hash and size attributes).

Referring to FIG. 5 and as previously described, interposition (including interposition 581 on execution attempt 201) is facilitated using any suitable interposition techniques (e.g., hooking file system calls, hooking a function pointer table in an operating system kernel and/or interposing a file filter driver). Information from whitelist 405 (including information propagated in correspondence with calls, spawns, forks, execs, etc. and recorded in process tracking tables 501) is used to support decisions to allow or disallow attempts to execute various code images along code trajectory 551. Thus, attempt (201) to execute an initial code image (here code image 571) is interposed upon (581). If no matching trust object is currently maintained in process tracking tables 501, whitelist 405 is consulted and (in the illustration of FIG. 5) contents of a matching entry 406 are introduced into appropriate trust objects 512 of process tracking tables 501. From there, whitelist-sourced protection attributes are associated with the evolving set of handles, threads and dlls employed in an execution context (of process P1) that executes code image 571.

Typically, process tracking tables 501 are implemented as an operating system kernel-resident data structure which is maintained in correspondence with interposed upon operating system kernel events. For example, in some Windows operating system embodiments, process tracking tables 501 are maintained, at least in part, by hooking a system calf table and particular system call vectors thereof such as NTCreateFile, NTOpenFile, NTCreateSection, NTCreateProcess, NTCreateThread, etc. By hooking such system calls (or otherwise interposing), the security infrastructure is able to collect the identifiers that a particular process uses to identify file or memory resident code images and constituent threads. In some operating systems, an evolving runtime set of identifiers may be employed and process tracking tables 501 support efficient lookup of operative protection attributes using such identifiers. In addition, by hooking such system calls (or otherwise interposing), the security infrastructure is able propagate protection attributes to the called, spawned or forked process, its code images and constituent threads.

Because some operating systems, and in particular, some Windows operating systems, support the concurrent use of a multiple types and instances of runtime identifiers (e.g., file handles, section handles, etc.) to identify a given code image, process tracking tables 501 includes fields for multiple handles 511. Likewise, because some operating systems and in particular, some Windows operating systems, allow a given code image to incorporate code from a variety of dynamically linked libraries, fields for identifying such DLLs 513 are also provided. Finally, because some operating systems and in particular, some Windows operating systems, support multi-threaded execution, fields for recording ids of constituent threads are also provided. By capturing and maintaining such a dynamically varying set of runtime identifiers, the security infrastructure may interpose upon appropriate system calls and associate a particular interposed upon execution with cached protection attributes (e.g., encoded as a whitelist-sourced trust object 512). Based on the description herein, persons of ordinary skill in the art will appreciate modifications to the cached set of identifiers, which may be appropriate for other operating systems or execution environments.

Using techniques illustrated in FIG. 5, security infrastructures in accordance with some embodiments of the present invention effectively cache whitelist information and protection attributes in association with a runtime set of identifiers (e.g., name/pathname, handle, dll and/or thread identifiers) associated with the code image 571 for which execution is initially attempted (201). The security infrastructure then leverages those identifiers to recognize the association of pertinent interposed-upon system calls with code image 571 and to propagate protection attributes cached for code image 571 to additional processes invoked (502, 503) along code trajectory 551. By accumulating the relevant identifiers and storing whitelist-sourced trust objects 512 in association therewith, process tracking tables 501 provide a useful kernel-resident data structure (that is not exposed to user code access) against which the security infrastructure may efficiently check for protection attributes, including the above-described allow-execute (X) and trust-changes (T) protection attributes.

An initial succession (582, 583) of interposed-upon call flows 453 are illustrated in correspondence with attempts to execute further images (572, 573) along code trajectory 551 (via call/spawn/fork/exec 502, 503). For simplicity of description, decisioning with respect to particular code images is omitted from FIG. 5. Instead, capture of process tracking information (for processes, associated DLLs and constituent threads) and propagation of whitelist-sourced protection attributes through such calls, spawns, forks, execs are emphasized. Thus, in an execution sequence of code image 571 that seeks to initiate a new process:

by opening a file containing a new code image 572, e.g., by execution of an NTOpenFile system call, by using a file handle (FH1) returned by NTOpenFile to map the code image to memory, e.g., by execution of an NTCreateSection system call, and by using a section handle (SH2) returned by NTCreateSection to create the new process, e.g., by execution of an NTCreateProcess system call, capture and recording of the dynamically created handles (e.g., FH1 and SH2) allows, interposition mechanisms 580 of the security infrastructure to associate the interposed-upon system calls with execution of code image 571 and to propagate protection attributes encoded in trust objects 512 to trust objects 522 maintained in association with handles, dlls and thread identifiers used by the operating system to identify a new process P2 (and its associated dlls and threads) that execute code image 572.

Likewise, in an execution sequence of code image 572 that seeks to initiate yet another process by (i) opening a file containing yet another code image 573, (ii) mapping the code image to memory and (iii) creating the new process P3, the capture and recording of runtime identifiers (e.g., file handles, section handles and/or other identifiers) associated with execution of code image 572 allows interposition mechanisms 580 of the security infrastructure to recognize the system calls that constitute call/spawn/fork/exec 503 and to appropriately propagate whitelist-sourced protection attributes to the resulting process P3, its threads and dlls. For example, in the illustration of FIG. 5, an interposed upon (583) system call (e.g., an NTCreateProcess system call) is matched with trust objects 522 based on an identifier (e.g., section handle SH3) captured and tracked in the course of process P2. Based on that match contents of trust object(s) 522 are further propagated to process tracking table entries for process P3.

In the illustrated embodiment, process tracking tables 501 are maintained separately from (though generally in correspondence with) process tables maintained by an operating system, hypervisor or other execution environment. Of course, in some embodiments, state maintained in process tracking tables 501 (and indeed interpositioning) may be integrated with facilities of an operating system, hypervisor or execution environment. Indeed, in some embodiments, process tracking and/or interposition may be based on facilities or capabilities of a virtualization system. Nonetheless, for generality of description, the description herein generally assumes that interposition, process tracking cache 452 (recall FIG. 4) and process tracking tables 501 operate by hooking events in the operating system kernel but without complicity or cooperation from the operating system.

Figure 6:
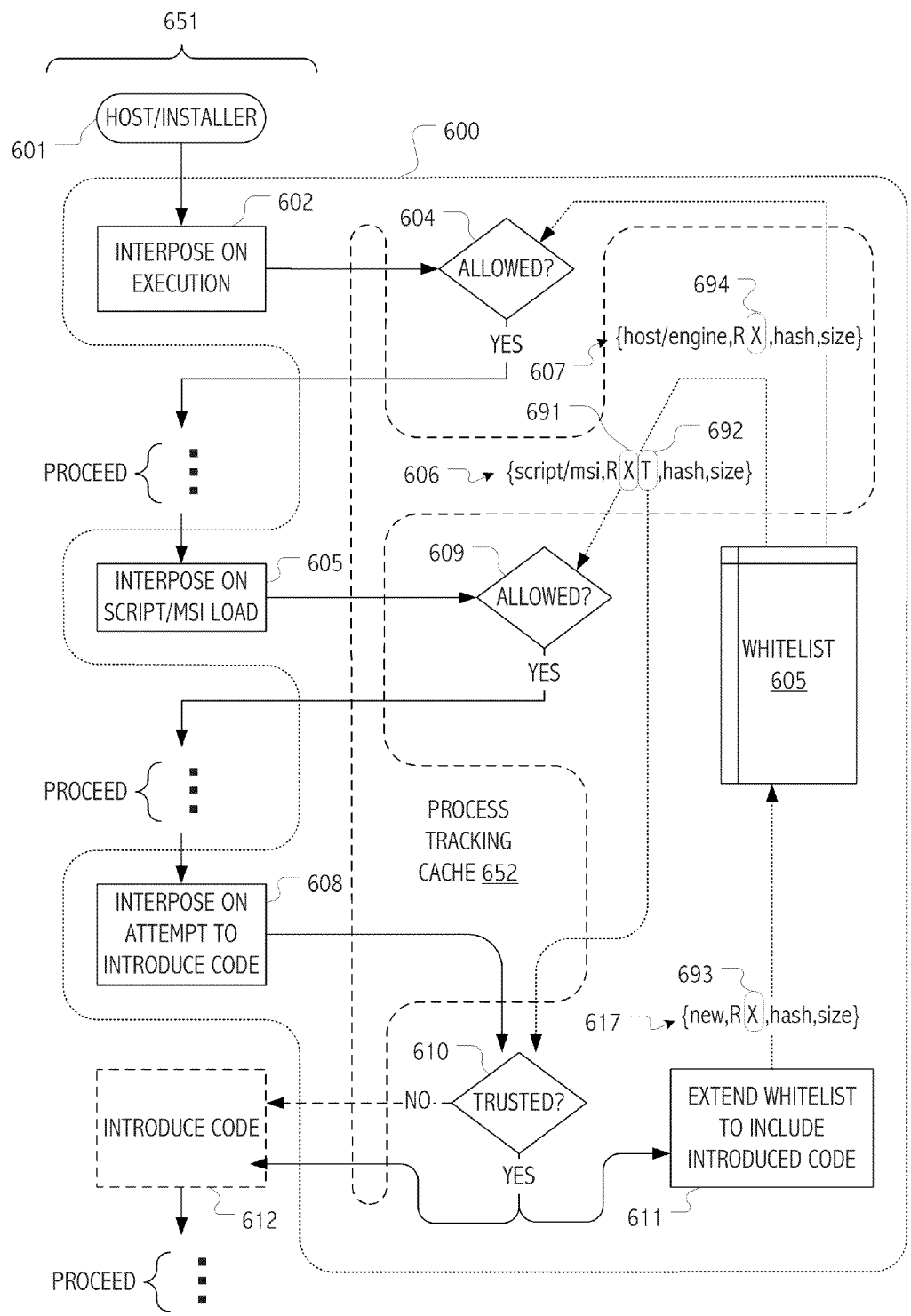
FIG. 6 is a flow diagram that depicts selected operational aspects of a security infrastructure that, in accordance with some embodiments of the present invention, allows trust objects associated with scripts or installer objects (e.g., .msi Windows installer files) to establish trust status for introduction of code into a computational system and corresponding extensions to an operant whitelist to allow subsequent execution of code so introduced.
Figure 7:
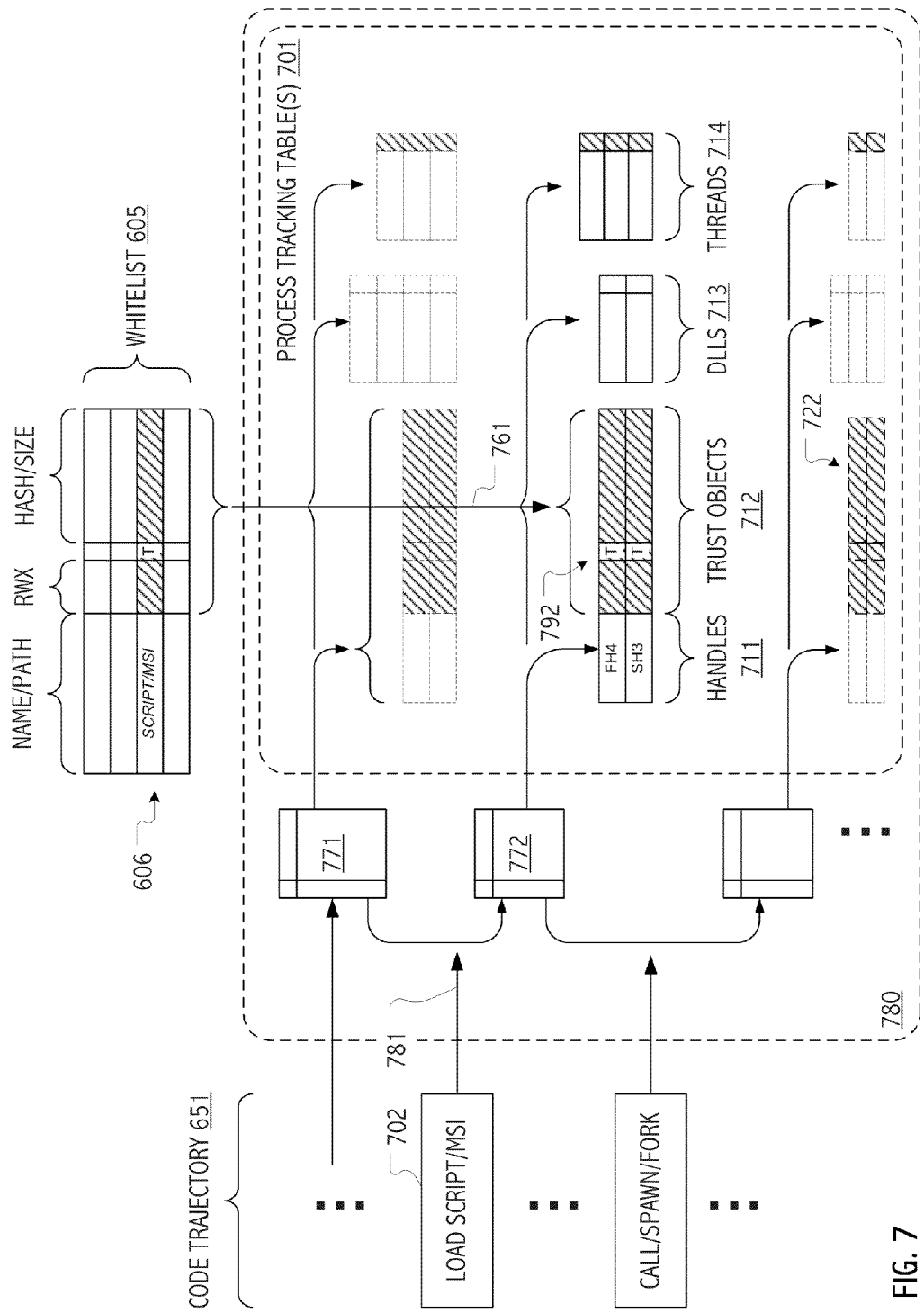
FIG. 7 illustrates propagation, via a process tracking cache, of trust attributes from a whitelist entry corresponding to a script or installer object to execution processes and/or threads through successive software component invocations, e.g., via call, spawn, fork/exec and/or interprocess communication mechanisms, in accordance with some embodiments of the present invention.

FIGS. 6 and 7 depict variations on the embodiments previously described with reference to FIGS. 4 and 5. In these additional variations, trusted change may be based on protection attributes that are associated with (and convey from) a source, script or installer package rather than (or rather than just) the interpreter, scripting engine or host process whose operation is defined or specialized by the source, script or installer package.

For example, FIG. 6 is a flow diagram that depicts selected operational aspects of a security infrastructure that, in accordance with some embodiments of the present invention, allows trust objects associated with scripts or installer objects (e.g., .msi Windows installer files) to establish trust status for introduction of code into a computational system and for corresponding extensions to an operant whitelist to allow subsequent execution of code so introduced. FIG. 7 then illustrates propagation, via a process tracking cache, of trust attributes from a whitelist entry corresponding to a script or installer object to execution processes and/or threads through successive software component invocations, e.g., via call, spawn, fork/exec and/or interprocess communication mechanisms, in accordance with some embodiments of the present invention.

Turning first to FIG. 6, a process tracking cache 652 is once again used to track related processes, threads and/or dlls, etc. and to propagate protection attributes though call sequences, process forks, execs and/or spawns, etc. However, whitelist 605 and the trust objects maintained by process tracking cache 652 also cover scripts and installer packages (e.g., .msi Windows installer files). Thus, the illustrated security infrastructure 600 contemplates whitelist-based definitions of protection attributes for both the sources (e.g., the scripts, .msi files, etc.) and the code images that define the scripting engine or host process that executes such sources. Therefore, in some deployments, a scripting engine or installer host process (such as execution of an msiexec code image) may be allowed to execute (X) but not intrinsically trusted to make changes (not T). Instead, individual scripts and installer packages, when appropriate (whether based on source, administrator approval or other security policy considerations), may be whitelisted with protection attributes that signify (and convey) trust to make changes (T).

The process tracking cache is described in greater detail below but, relative to some embodiments of the present invention, can be used to facilitate trust checks involved in the script- or installer-based introduction of code into a computational system. In general, process tracking cache 652 maintains information (e.g., handles, descriptors, pathnames, bindings, etc.) by which interposition techniques described herein may recognize pertinent process, thread and file system operations and track associated threads, dynamically linked libraries (dlls), etc. In addition to the whitelist entries discussed above, some of whitelist 605 information maintained in process tracking cache 652 encodes protection attributes for sources (e.g., the scripts, .msi files, etc.) and allows security infrastructure 600 to include trust-changes attributes for a given source (script, .msi file, etc.) in its decisioning relative to interposed upon operations of a particular process/thread instance of the scripting engine or host process that processes the source.

As before, process tracking cache 652 both caches information from a whitelist (here, whitelist 605) and facilitates resolution of protection attribute checks (e.g., allowed check 604, allowed check 609 and trusted check 610) against appropriate whitelist information even for executions that inherit their protection attributes as a thread of execution or through calls, forks, execs and/or spawns along execution sequence 651.

Security infrastructure 600 extends the application whitelisting features introduced in FIGS. 2, 3 and 4 and certain aspects will be understood based on the preceding description. Upon an attempt to execute scripting engine, host process or installer 601, security infrastructure 600 employs (602) one or more interposition techniques to detect the attempt and to thereby facilitate identification of the particular code image to be executed. In the illustrated example, a 3-tuple {host/engine, hash, size} of elements available or ascertainable from the execution context of the interposed upon file system operation is compared against corresponding fields of an allow-type entry from whitelist 605. In the illustrated example, the element "host/engine" will be understood as any name/pathname identifier used to identify the scripting engine, installer or host process and, in view of the preceding description of a process tracking cache, will be understood to encompass handles or other identifiers for such an engine, installer or host process, which may be employed, captured and used to facilitate decisioning. Accordingly, process tracking cache 652 facilitates the comparison based on information presented as entry 607 (which includes encoded allow-read (R) and allow-execute (X) protection attributes). As before, based on results of the comparison, the executable is either (i) allowed to load into or map to memory and proceed with execution or (ii) denied.

At some point in execution sequence 651, security infrastructure 600 interposes upon an operation that attempts to load source information used in the execution of the scripting engine, installer or host process for which execution was either directly or indirectly allowed pursuant to allowed check 604. Of course, as described above with respect to FIGS. 4 and 5, a process tracking cache (here, process tracking cache 652) may facilitate propagation of an allow-execute (X) protection attribute through call/fork/exec type sequences. However, in the presently illustrated case, it is notable that no trust-changes (T) protection attribute conveys from a predecessor along execution sequence 651. In any case, security infrastructure 600 employs (605) one or more interposition techniques to detect the attempt and to thereby facilitate identification of the particular script or .msi to be load. A 3-tuple {script/msi, hash, size} of elements available or ascertainable from the execution context of the interposed upon file system operation is compared against corresponding fields of an allow-type entry from whitelist 605. In the illustrated example, the element "script/msi" will be understood as any name/pathname identifier used to identify the script, installer package or other source and, in view of the preceding description of a process tracking cache, will be understood to encompass handles or other identifiers for such an script, installer package or other source, which may be employed, captured and used to facilitate decisioning. Accordingly, process tracking cache 652 facilitates the comparison based on information presented as entry 606 (which includes encoded allow-read (R), allow-execute (X) and trust-changes (T) protection attributes). In the illustrated example, based on results of the comparison, the script, installer package or other source is allowed to load into or map to memory and execution proceeds. Perhaps more significantly, a trust-changes (T) protection attribute 692 is conveyed from the whitelist entry corresponding to the particular script, installer package or other source loaded Execution proceeds to a point at which the image attempts to introduce code into storage of the computational system. Once again, the security infrastructure interposes (608) on the attempt. The security infrastructure again employs one or more interposition techniques (e.g., hooking a file system call, hooking a function pointer table entry, interposing a file filter driver, etc.) to detect the attempt and based on whitelist information conveyed via process tracking cache 652. As before, any of a variety of operations may be interposed upon, including in some embodiments, a file create operation, a file open for write operation, or the like. Using the protection attributes propagated using process tracking cache 652 and, in particular, based (in the illustrated scenario) on the trust-changes (T) protection attribute 692 conveyed (694) from entry 606, security infrastructure 600 determines (610) that the attempt is by a trusted code image.

Because the file system target (here, file/pathname new) of the attempt is ascertainable from the context of the interposed upon execution, security infrastructure 600 is in a position to extend the whitelist to include an entry for the code introduced by execution of the trusted code. Accordingly, in the illustrated embodiment, security infrastructure 600 extends (611) whitelist 605 by adding a new entry 617 for the executable image being introduced into the computational system as a trusted change. More specifically, added entry 617 codes an allow-execute (X) protection attribute 693 and specifies that an executable image associated with the filename new (or appearing at a fully or partially specified path new, with or without wildcards) is allowed to execute if an SHA1 hash and size for the image can be matched. As before, the previously interposed upon code may actually introduce (612) the new code prior to, after or generally coincident with the whitelist extension (611).

Because execution of an individual code image is governed by whitelist 605, it is typically not necessary to interdict introduction (612) of the new code, even if the attempting executable is not trusted. As before, an executable introduced into storage of the computational system will be allowed to execute only if a corresponding allow-type entry appears in the whitelist (e.g., coded as an allow-execute (X) protection attribute). Absent a trust-changes (T) protection attribute 692 associable with the introducing code (e.g., as conveyed 694 from whitelist entry 606 associated with the aforementioned script/msi), no allow-type entry is created for the newly introduced code. As a result, new code introduced by existing code that is allowed to execute, but not trusted to make changes, will fail whitelist checks if execution is later attempted. As before, additional interdiction capabilities may be provided if desired.

FIG. 7 illustrates techniques and related process tracking table states in accordance with some embodiments of the present invention whereby trust-changes (T) protection attributes not initially associated with a code trajectory, are conveyed from a whitelist entry that corresponds to a script, installer package or other source loaded in the course thereof. FIG. 7 builds upon FIG. 5 and will be understood based on the previous discussion. Indeed, as before, operant protection attributes may be propagated in correspondence with successive code invocations, e.g., through calls, spawns and/or fork/exec type mechanisms, of a code trajectory (here, code trajectory 651). As before, the allow-execute (X) protection attributes conveyed through preceding calls, spawns and/or fork/exec type mechanisms. However, more significantly, trust-changes (T) protection attributes are introduced based on whitelisting of a particular script, installer package or other source. Thus, a security policy need not trust all changes made by a generic host process (e.g., in some Windows operating system embodiments, by instance of svchost or msiexec), but rather may restrict the ambit of trust-changes protection attributes to execution instances that executed a particular script, installer package or source.

The illustrated techniques and process tracking table states correspond to operations performed in some embodiments of process tracking cache 652 and in accord with whitelist-based decisioning such as described above: In particular, code image 771 is executed based on allow-execute (X) protection attributes associated with the code image itself (or propagated through preceding code invocations not specifically shown in FIG. 7). Entry 606 of whitelist 605 is consulted in furtherance of allowed check 609 (recall FIG. 6) in connection with an interposed upon (781) attempt at 702 to load a script, installer package or other source (illustrated as image 772) identified using file/pathname script/msi (or based on corresponding handles maintained in process tracking tables 701) with confirmed hash and size attributes. Based on such a load, the trust-changes (T) protection attribute encoded in entry 606 is introduced 761 into trust objects 712 as state 794 and, as described above with reference to FIG. 5, may be propagated through subsequent calls, spawns and/or fork/exec type mechanisms (e.g., to further trust objects 722).

As previously described, interposition is facilitated using any suitable interposition techniques (e.g., hooking file system calls, hooking a function pointer table in an operating system kernel and/or interposing a file filter driver). Information from whitelist 605 (including information propagated and recorded in process tracking tables 701 in correspondence with loads of scripts, installer packages or sources and/or in correspondence with calls, spawns, forks, execs, etc.) is used to support decisions to allow or disallow attempts to load or execute various code images along code trajectory 651. Thus, attempt 702 to load a particular script or .msi (here code image 772) is interposed upon (781). If no matching trust object is currently maintained in process tracking tables 701, whitelist 605 is consulted and (in the illustration of FIG. 7) contents of a matching entry 606 are introduced into appropriate trust objects 712 of process tracking tables 701. From there, whitelist-sourced protection attributes are associated with the evolving set of handles, threads and dlls employed in an execution context that executes code image 772.

As before, process tracking tables 701 are implemented as an operating system kernel-resident data structure which is maintained in correspondence with interposed upon operating system kernel events. In some Windows operating system embodiments, process tracking tables 701 are maintained, at least in part, by hooking a system call table and particular system call vectors thereof such as NTCreateFile, NTOpenFile, NTCreateSection, NTCreateProcess, NTCreateThread, etc. By hooking such system calls (or otherwise interposing), the security infrastructure is able to collect the identifiers that a particular process uses to identify file or memory resident code images and constituent threads. In some operating systems, an evolving runtime set of identifiers may be employed and process tracking tables 701 support efficient lookup of operative protection attributes using such identifiers. In addition, by hooking such system calls (or otherwise interposing), the security infrastructure is able to propagate protection attributes to the called, spawned or forked process, its code images and constituent threads.

As before, consistent with identifier sets employed in some Windows operating systems, process tracking tables 701 include fields for multiple handles 711. Likewise, fields for identifying such DLLs 713 are provided together with fields for recording ids of constituent threads 714. By capturing and maintaining such a dynamically varying set of runtime identifiers, the security infrastructure may interpose upon appropriate system calls and associate a particular interposed upon execution with cached protection attributes (e.g., encoded as a whitelist-sourced trust object 512). Of course, other operating systems and/or execution environments may employ different sets or types of identifiers and based on the description herein, persons of ordinary skill in the art will appreciate modifications that may be appropriate for such operating systems or execution environments.

For simplicity of description, decisioning with respect to particular code images is omitted from FIG. 7. Instead, introduction of the trust-changes (T) protection attribute and propagation through such calls, spawns, forks, execs are emphasized. Thus, in an execution sequence of code image 771 that seeks to load a script or .msi:

by opening a file containing the script or .msi (code image 772), e.g., by execution of an NTOpenFile system call,
    by using a file handle (FH4) returned by NTOpenFile to map the code image to memory, e.g., by execution of an NTCreateSection system call, and
    by using a section handle (SH3) returned by NTCreateSection to create the new process to execute the script, e.g., by execution of an NTCreateProcess system call, capture and recording of the dynamically created handles (e.g., FH4 and SH3) allows, interposition mechanisms 780 of the security infrastructure to first associate system calls interposed-upon during the course of execution of code image 771 with operant allow-execute (X) protection attributes and then to identify an interposed-upon load attempt as targeting a script or .msi that conveys further trust-changes (T) protection attributes. From there (and as previously described with reference to FIG. 5), interposition mechanisms 780 allow the security infrastructure to propagate protection attributes (including the aforementioned allow-execute (X) and trust-changes (T) protection attributes) encoded in trust objects 712 to trust objects 722 that are maintained in association with handles, dlls and thread identifiers used by the operating system to identify further processes (and associated dlls and threads) that execute code along code trajectory 651.

As before, the illustrated process tracking tables 701 are maintained separately from (though generally in correspondence with) process tables maintained by the operating system itself. Of course, in some embodiments, state maintained in process tracking tables 701 (and indeed interpositioning) may be integrated with facilities of an operating system, hypervisor or other execution environment. Nonetheless, for generality of description, the description herein generally assumes that interposition, process tracking cache 652 (recall FIG. 6) and process tracking tables 701 operate by hooking events in the operating system kernel but without complicity or cooperation from the operating system.

Figure 8:
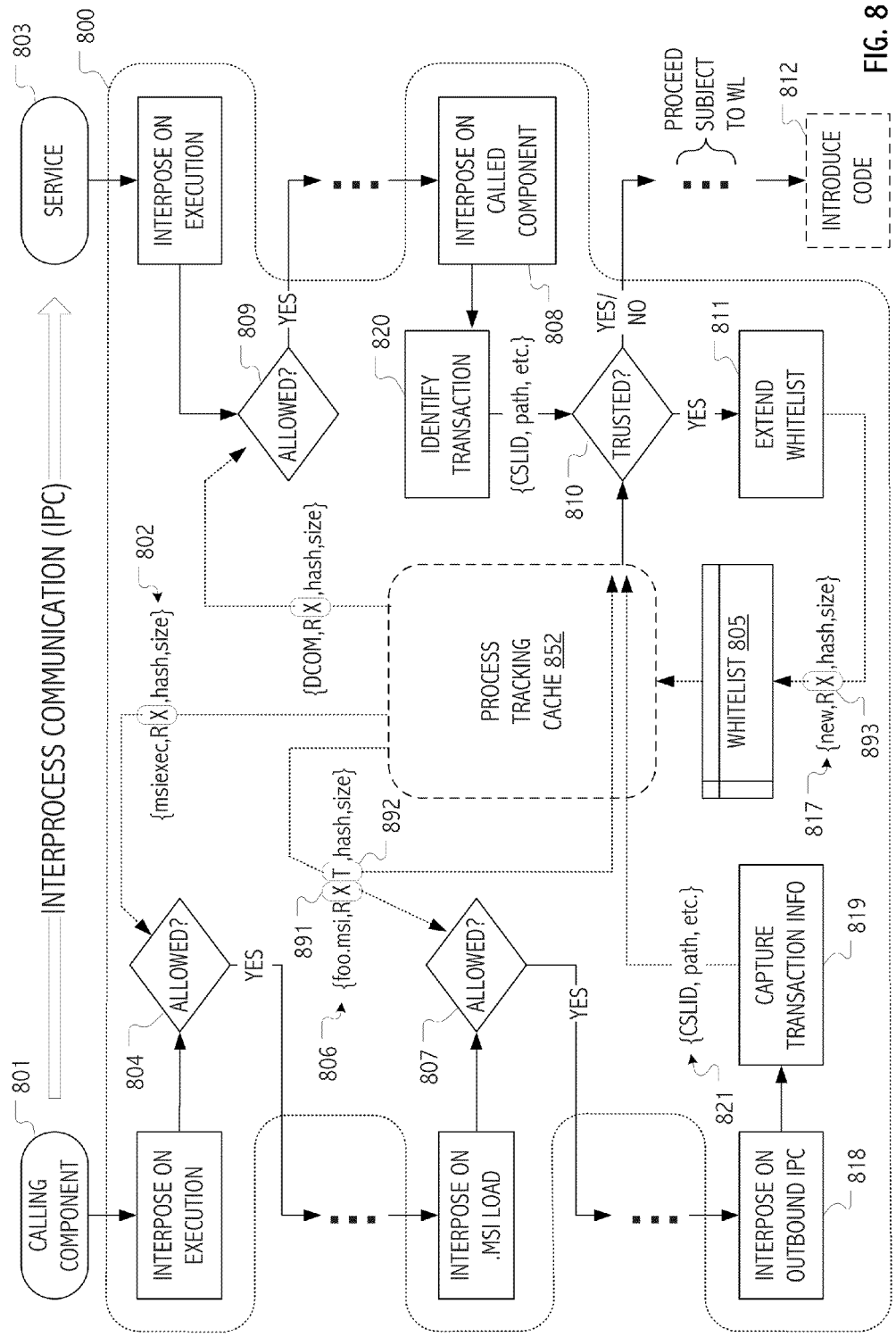
FIG. 8 is a flow diagram that depicts selected operational aspects of a security infrastructure that, in accordance with some embodiments of the present invention, allows trust objects associated with scripts or installer objects (e.g., .msi Windows installer files) to establish and propagate across interprocess communications trust status for introduction of code into a computational system and corresponding extensions to an operant whitelist to allow subsequent execution of code so introduced.

FIG. 8 is a flow diagram that depicts selected operational aspects of a security infrastructure that, in accordance with some embodiments of the present invention, allows trust objects associated with scripts or installer objects (e.g., .msi Windows installer files) to establish and propagate trust-changes (T) and other protection attributes across interprocess communications for introduction of code into a computational system and corresponding extensions to an operant whitelist to allow subsequent execution of code so introduced. FIG. 8 simplifies certain aspects that will be understood based on the description of FIGS. 6 and 7, but adds additional detail relative to embodiments that leverage interprocess communications facilities such as in software systems that build upon Microsoft's Distributed Component Object Model (DCOM) to support communication among objects on different computers.

A process tracking cache (here, process tracking cache 852) is once again used to track related processes, threads and/or dlls, etc. and to propagate protection attributes though call sequences, process forks, execs and/or spawns, etc. However, process tracking cache 852 is extended to, in the illustrated embodiment and scenario, facilitate tracking through interprocess communications. Thus, the sets of tracked and cached identifiers discussed with reference to FIGS. 6 and 7 may be extended to include identifiers suitable (in a particular implementation or execution environment) for identifying called components. Examples include any of a variety of globally (or at least practically) unique identifiers (GUIDs) such as class identifiers (CSLIDs) employed in registries of some Windows operating systems, file system paths, universal resource identifiers (URIs), etc.

As before, whitelist 805 and the trust objects maintained by process tracking cache 852 also cover scripts and installer packages (e.g., .msi Windows installer files). Thus, the illustrated security infrastructure 800 contemplates whitelist-based definitions of protection attributes for the sources (e.g., the scripts, .msi files, etc.) and the code images that define the scripting engine and/or host processes or services that execute such sources or which execute a called component. Therefore, in some deployments, a scripting engine or installer host process (such as execution of an msiexec code image) may be allowed to execute (X) but not intrinsically trusted to make changes (not T). Instead, individual scripts and installer packages, when appropriate (whether based on source, administrator approval or other security policy considerations), may be whitelisted with protection attributes that signify (and may convey to a called component) trust to make changes (T).

The process tracking cache is used to facilitate trust checks involved in the interprocess communication (IPC) mediated introduction of code into a computational system. In general, process tracking cache 852 maintains identifiers (e.g., handles, descriptors, pathnames, CLSIDs, bindings, etc.) by which interposition techniques described herein may recognize pertinent process, thread, file system and IPC operations and track associated threads, dynamically linked libraries (dlls), IPC targets, etc. within call arguments or data structures of an interposed upon execution context. In the illustrated embodiment, whitelist 805 information maintained in process tracking cache 852 encodes protection attributes for sources (e.g., the scripts, .msi files, etc.) and allows security infrastructure 800 to include trust-changes attributes for a given source (script, .msi file, etc.) in its decisioning relative to interposed upon operations of a particular process/thread instance of a scripting engine or host process that processes the source or a called component such as that later interposed upon at 808.

As before, process tracking cache 852 both caches information from a whitelist (here, whitelist 805) and facilitates resolution of protection attribute checks (e.g., allowed check 804, allowed check 807, allowed check 809 and trusted check 810) against appropriate whitelist information even for executions that (if applicable) may inherit their protection attributes as a thread of execution or through calls, forks, execs, spawns and/or interprocess communications along an execution trajectory.

Security infrastructure 800 extends the application whitelisting features introduced in FIGS. 2, 3, 4 and 6 and certain aspects will be understood based on the preceding description. In the illustrated embodiment and scenario, upon an attempt (by calling component 801) to invoke execution of an msiexec instance, security infrastructure 800 employs one or more interposition techniques to detect the attempt and to thereby facilitate identification of the particular code image to be executed. In the illustrated example, a 3-tuple {msiexec, hash, size} of elements available or ascertainable from the execution context of the interposed upon file system operation is compared against corresponding fields of an allow-type entry from whitelist 805. In the illustrated example, the element "msiexec" will be understood as any identifier used to identify the installer and, in view of the preceding description of a process tracking cache, will be understood to encompass handles or other identifiers which may be employed, captured and used to facilitate decisioning. Accordingly, process tracking cache 852 facilitates the comparison based on information presented as an entry 802 (which includes encoded allow-read (R) and allow-execute (X) protection attributes). As before, based on results of the comparison, the executable is either (i) allowed to load into or map to memory and proceed with execution or (ii) denied.

At some point in the execution trajectory, security infrastructure 800 interposes upon an operation that attempts to load source information (here an .msi) used in the execution of the installer for which execution was either directly or indirectly allowed pursuant to allowed check 804. Of course, as described above with respect to other embodiments, a process tracking cache (here, process tracking cache 852) may facilitate propagation of an allow-execute (X) protection attribute through call/fork/exec type sequences. However, in the presently illustrated case, it is notable that no trust-changes (T) protection attribute need convey from a predecessor along the execution trajectory.

Security infrastructure 800 employs one or more interposition techniques to detect the attempt and to thereby facilitate identification of the particular .msi to be loaded. A 3-tuple {foo msi, hash, size} of elements available or ascertainable from the execution context of the interposed upon file system operation is compared against corresponding fields of an allow-type entry from whitelist 805. In the illustrated example, the element "foo.msi" will be understood as any name/pathname identifier used to installer package or other source and, in view of the preceding description of a process tracking cache, will be understood to encompass handles or other identifiers for such an script, installer package or other source, which may be employed, captured and used to facilitate decisioning. Accordingly, process tracking cache 852 facilitates the comparison based on information presented as entry 806 (which includes encoded allow-read (R), allow-execute (X) and trust-changes (T) protection attributes).

In the illustrated example, based on results of the comparison, the script, installer package or other source is allowed to load into or map to memory and execution proceeds. Perhaps more significantly, a trust-changes (T) protection attribute 892 is eventually conveyed from the whitelist entry corresponding to the particular script, installer package or other source loaded to decisioning (trusted check 810) for a called component subsequently executed based on the illustrated interprocess communication to service 803 and interposed upon at 808.

Execution proceeds (via call/fork/exec type sequences not individually illustrated) to a point at which a code image that derives its allow-execute (X) protection attribute from entry 806 attempts an outbound interprocess communication. Once again, the security infrastructure interposes (818) on the attempt. The security infrastructure employs one or more interposition techniques (e.g., hooking a file system call, hooking a function pointer table entry, interposing a file filter driver, etc.) to detect the attempt and based on whitelist information conveyed via process tracking cache 852 to identify the interposed upon attempt as associated with the execution trajectory for which protection attributes of entry 806 apply. Relative to the outbound interprocess communication, any of a variety of operations may be interposed upon, including in some embodiments, a socket or handle create operation, a remote procedure call (RPC) operation, etc. Security infrastructure 800 captures (819) transaction information (e.g., identifiers 821) for the outbound interprocess communication for inclusion (in the illustrated scenario) in process tracking cache 852 with the trust-changes (T) protection attribute 892 conveyed from entry 806. Any of a variety of identifiers (e.g., handles, descriptors, pathnames, CLSIDs, bindings, etc.) may be captured using interposition techniques described herein to facilitate identification (e.g., at 820) of a corresponding called component and/or transaction that is, or follows in the execution trajectory, an IPC target of the illustrated interprocess communication from calling component 801 to service 803.

As a result of the illustrated interprocess communication, execution eventually proceeds to a point at which the called component (or a code image that itself follows further calls/forks/execs/IPCs) attempts to introduce code into storage of the computational system. In the illustrated embodiment and scenario, the security infrastructure interposes (808) on the attempt by the called component. The security infrastructure employs one or more interposition techniques (e.g., hooking a file system call, hooking a function pointer table entry, interposing a file filter driver, etc.) to detect the attempt and based on whitelist information conveyed via process tracking cache 852. Using the conveyed protection attributes and, in particular, based (in the illustrated scenario) on the trust-changes (T) protection attribute 892 conveyed from entry 806 (i.e., in accord with the illustrated interprocess communication from calling component 801 to service 803), security infrastructure 800 determines (810) that the attempt is by a trusted code image.

As before, the file system target (here, file/pathname new) of the attempt is ascertainable from the context of the interposed upon execution, and security infrastructure 800 is in a position to extend the whitelist to include an entry for the code introduced by execution of the trusted code. Accordingly, in the illustrated embodiment, security infrastructure 800 extends (811) whitelist 805 by adding a new entry 817 for the executable image being introduced into the computational system as a trusted change. More specifically, added entry 817 codes an allow-execute (X) protection attribute 893 and specifies that an executable image associated with the filename new (or appearing at a fully or partially specified path new, with or without wildcards) is allowed to execute if an SHA1 hash and size for the image can be matched. As before, the previously interposed upon code may actually introduce (812) the new code prior to, after or generally coincident with the whitelist extension (811).

Because execution of an individual code image is governed by whitelist 805, it is typically not necessary to interdict introduction (812) of the new code, even if the attempting executable is not trusted. As before, an executable introduced into storage of the computational system will be allowed to execute only if a corresponding allow-type entry appears in the whitelist (e.g., coded as an allow-execute (X) protection attribute). Absent a trust-changes (T) protection attribute 892 associable with the introducing code (e.g., as conveyed from whitelist entry 806 associated with the aforementioned foo.msi), no allow-type entry is created for the newly introduced code. As a result, new code introduced by existing code that is allowed to execute, but not trusted to make changes, will fail whitelist checks if execution is later attempted. As before, additional interdiction capabilities may be provided if desired.

Figure 9:
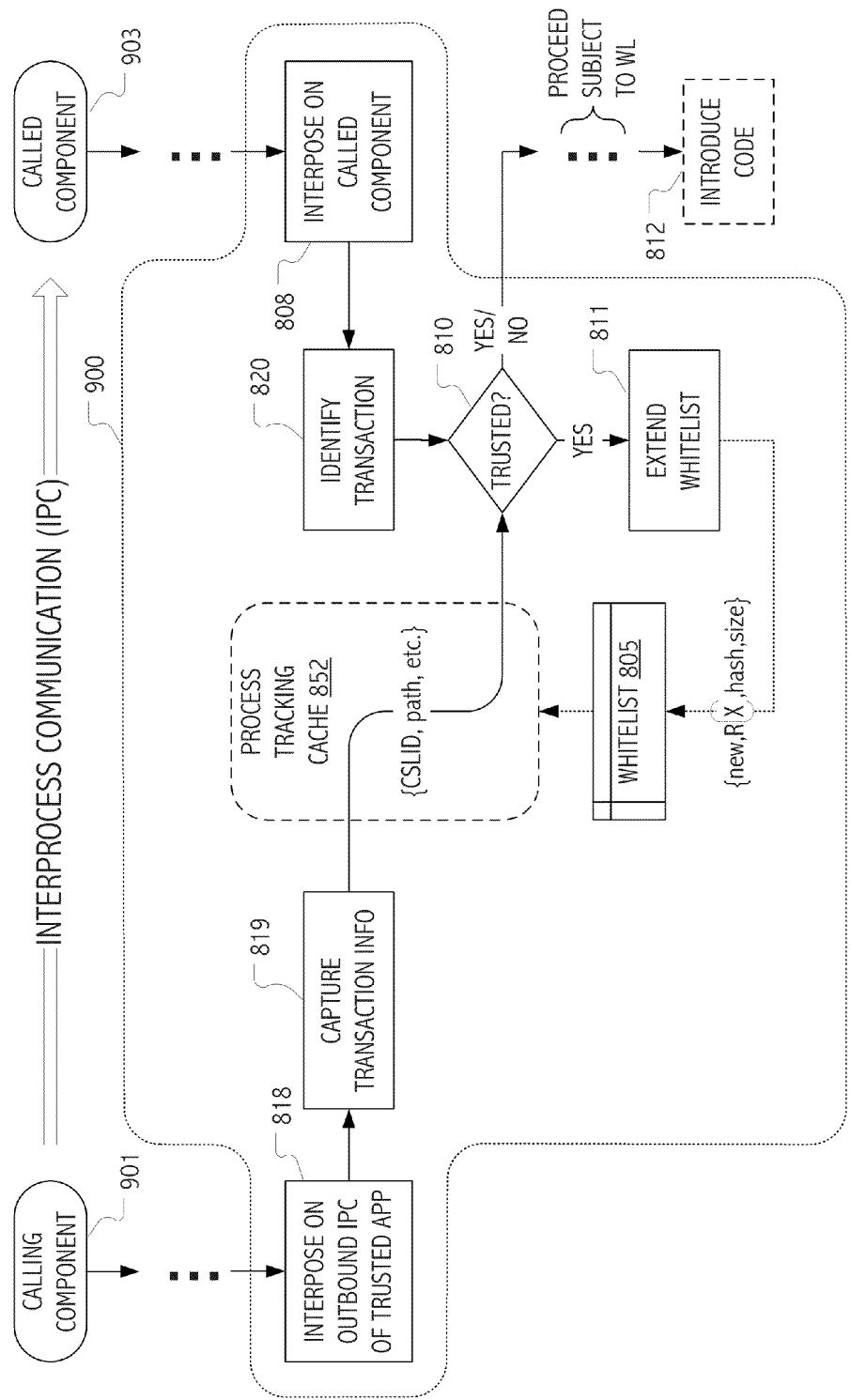
FIG. 9 is a flow diagram that depicts selected operational aspects of a security infrastructure that, in accordance with some embodiments of the present invention, propagates trust across interprocess communications in a way that selectively provides extensions to an operant whitelist in correspondence with introduction of code by trusted execution.

FIG. 9 is a flow diagram that depicts selected operational aspects of an analogous security infrastructure 900 that, in accordance with some embodiments of the present invention, propagates trust changes (T) and other protection attributes across an interprocess communication between a calling component 901 and a called component 903 in a way that selectively provides extensions to an operant whitelist in correspondence with introduction of code by trusted execution. For avoidance of doubt, FIG. 9 illustrates operations analogous to those previously described, but without regard to the host/script facilities (such as the Windows installer, msiexec, facilities) that appear in the embodiment and scenario of FIG. 8. Additionally, FIG. 9 illustrates operational aspects of security infrastructure 900 without regard to a Distributed Component Object Model (DCOM) implementation.

Trust Models

In the preceding description, whitelisting- and interposition-based mechanisms have been described in the context of certain illustrative protection attribute states associated with particular code instances and using codings that associate such protection attributes with cached identifiers for processes, handles, dlls and threads. For simplicity of description, we have, at times, presented particular protection attribute states as based on whitelist entries for which a generally one-to-one correspondence exists with particular code instances. Nonetheless, in some embodiments, whitelist and protection attribute states may follow from trust models and/or policies implemented by the security infrastructure. Certain exemplary trust model or policy-based sources are described in the material that follows.

In some embodiments in accordance the present invention, multiple models for trusted change, together with combinations (or compositions) thereof may be supported. For example, a trusted change policy may be specified in terms of one or more of the following:

Trusted "Applications": In general, an executable image, installer file, script, library, ActiveX control resource, dll, or other dynamically loaded executable, installer, or interpreted code may be trusted to make changes. Typically, a part of this trust includes the discrete or inferred whitelisting of the image itself. In general, a "trust to make changes" attribute may be specified using one or more additional attributes in a whitelist or using a separate encoding that specifies those applications trusted to make changes. In either case, trusted applications may be identified by any individual attribute or combination of attributes as defined below:

Cryptographic hash (regardless of algorithm) of the image

Filename of the image

Path (location on disk, including any inclusion in a wildcard "*.*" path or other implicit path, or the explicit path to the executable including any portion of it's full image name)

Size of the image

Trusted Updater: A trusted update model can be implemented as described above with respect to trusted application support. In a typical implementation, specification of a trusted system management facility includes some or all of the attributes of the trusted application category, but applies to executables, scripts or other utilities (typically of a system management nature) that are expected to exist on all endpoints to be secured. This trust model can be used to specify those components of an existing management infrastructure trusted to make changes. In some implementations, separate enumeration of trusted system management facilities may allow existing management and software updating technologies to continue to work on endpoints that have been secured. In addition, applications (i.e., executable images, installer files, scripts, libraries, ActiveX control resources, dlls or other dynamically loaded executables, or code) treated as part of trusted system management facility may be accorded greater latitude in the set of updates allowed or with respect to permanence or persistence of updates applied. Conceivably a trusted system management model can be employed in the updated of the whitelist framework itself, allowing for us to install updates for the administrator.

Trusted Network Share: A trusted network share model allows the system to specify a location, e.g., on a network share, shares, or subdirectories on a share specified by the administrator, from which executables are to be trusted to make changes. Although the implementation could specify an explicit path, such a specification may not be secure in practice, as a path to a network share can be easily spoofed by a user or malicious code wishing to violate policy. Rather, implementations may specify as an SMB share, as an NFS or other network share, FTP, TFTP, or SFTP share, SharePoint or other portal server share, or using an HTTP or HTTPS (SSL/TLS) defined share. Some implementations may require that there be an entity validating infrastructure (SSL/TLS) to ensure that spoofing and man-in-the-middle attacks are not possible.

Trusted Digital Signature: A trusted digital signature (or "trusted publisher") model may be used to allow the system to specify that a digitally signed subset of executable images, scripts, installer files, etc. are trusted to make changes. In some implementations, specific cryptographically-secured digital signatures may convey a level a trust, subject to optional verification using a trusted certification provider. In some implementations, executables may be trusted to make changes if they are digitally signed utilizing a standards-based or proprietary code signing algorithm for which the identity of the signer (or signing organization) can be verified.

Trusted Users: A trusted user model may be employed to allow a particular user or a group (organizational unit/group) or class of users to perform changes. The users optionally may be required to manually disable the security software or present the security software with additional credentials in order to perform their trusted changes, after which they either manually re-enable it or, the whitelisting system would return to its original functionality of limiting additions to the system. Additionally, the administrator may optionally specify that the user is required to provide verification (up to and including their username and/or password and/or CAPTCHA type verification to ensure that a user, and not code (regardless of good or malicious intent), is requesting the change) before any non-trusted executable code or installer is allowed to launch.

Trusted Zones: In some implementations, an operative trust model may be specified based for a script, executable, or installer based the "location" of the resource from which it is obtained. For example, in some implementations, locations may be defined for a resource based on physical, network, geographic or other proximity metric. Locations may be defined in a way that is analogous to (or even dependent upon) "Zones" defined by Internet Explorer, such as:

Local Computer. Code executed from and on the local computer itself (this is generally allowed the most liberal access to the system)

Trusted Sites: Not terribly different than Local Computer, Trusted Sites are URL's/URI's or IP addresses which are trusted to perform relatively significant changes to the system—due to their specific definition by the end user or system administrator as trusted sites.

Intranet: Generally a broader category (with narrower restrictions) than Trusted Sites; URL's/URI's or IP addresses which are trusted to perform relatively minor, if any changes to the system, due to their location on the Intranet—a local, trusted network with the endpoint system.

Internet: URL's/URI's or IP addresses which are trusted to perform almost no changes to the system, due to their location on the Internet—untrusted by the endpoint system.

Restricted Sites: URL's/URI's or IP addresses which are generally treated as untrusted and are largely contained from changing the system in any manner, due to their explicit exclusion of trust by the end user or administrator Trusted Manifest: A trusted manifest model may be employed to allow the whitelisting system to consume a third party list of trusted executables and to perform updates based on the trusted manifest. In general, a trusted manifest may be recognized whether located on the Internet, local Intranet, or copied to the local machine. Any of a variety of manifest coding schemes may be employed for "known trusted" content that may come from a third-party ISV, a user group, etc. in the form of one or more system images, including for physical and/or virtual machines and/or system deployment images.

Other Trust Models: Other possible trust models include definitions based on protocol address (e.g., trusted URL/URI/IP address/codebase) for a resource (server, client or other) or source media (e.g., local directory, USB, disk, CD/DVD media). In addition, a trusted time model may allow certain executables (particularly those trusted in accordance with some other trust model) to perform updates during a specified system maintenance window.

Compound Trust: In general, any composition or matrix of two or more of the foregoing trust models may be implemented. For example, a trusted user may be able to install anything from a trusted network share. Similarly, executables from a trusted network share that have a trusted digital signature may be allowed by some trusted update policies.

Extensions to the Application Whitelist

As described above, any of a variety of definitional models may be employed to specify the set of executable images that are allowed to execute, and perform changes to a computational system. These changes may take the form of changes to a file, registry (or other configuration data store), or to network access configurations, permissions, etc. In any case, the ability to add, configure, update or remove functionality may be of little import without further changes to the operative application whitelist. Therefore, implementations in accordance with the present invention may also extend (at least provisionally) a current security policy to add the new newly added, configured or updated executables to the application whitelist and/or, in the case of removed functionality, to delete corresponding entries from the application whitelist.

To facilitate management of the application whitelisting infrastructure, it can be desirable to securely inform the infrastructure (including e.g., the manager appliance in the above described implementation) that such changes have occurred and to optionally allow the infrastructure, application code, administrator, or other entity to accept or reject the changes. Accepted changes may be committed, making them a permanent part of the security definition. Alternatively, infrastructure, application code, administrator, or other entity may reject changes and revert to a prior state, up to and including the complete removal of the executables, reversion of the changes, and/or uninstallation of any application. Often, provisionally applied extensions to a whitelist operant at a given endpoint may persist for period of time before ultimately being accepted or rejected.

To facilitate the forgoing, some implementations in accordance with the present invention allow a trusted application (or other executable) which has been initially interposed upon by operation of a kernel-resident security infrastructure to, once authorized based on an implemented trust model, perform file system operations, such as creating, modifying or deleting files or directories. In some implementations and/or in accord with some trusted update policies, the executable may be allowed to add, modify or delete other protected states such as registry entries, configuration data, permissions, etc.

Child processes spawned by the trusted application are also allowed to do the same. As the file system writes occur, we log:
1. New executable files
2. Modified executable files
3. Deleted executable files
4. New non-executable files
5. Modified non-executable files
6. Deleted non-executable files
7. New directories
8. Deleted directories Upon completion of an install, entries corresponding to items 1-3 (new, modified or deleted executables) are added (or removed) from the current whitelist as an extension to the current security policy at the updated endpoint. In some implementations, the extension is named (or tagged) as:

DOMAIN\user—Host application.ext—dd:mm:yyyy—hh:mm based on a 24 hour clock and using a client offset. The extended policy is applied by the endpoint client and uploaded to the manager appliance for review and/or approval or rejection. An administrator is notified (e.g., at the console) that new application(s) have been installed. The administrator may then review new file policy for the changes provisionally made in accordance with the trusted change policy. The administrator can then:
1. Accept each new policy (and potentially rename it);
2. Merge each policy into the existing policy applied to the endpoint; or
3. Reject each policy individually (removing them from the endpoint as soon as possible), preventing the use of the application—the recommended process is to uninstall the application manually or automatically and remove the policy, to avoid registry garbage.

Example Scenarios
Trusted Installation

In an ideal scenario, execution of a trusted application would be enough. However, most operating systems also implement the concept of installation of applications (and the inverse, uninstallation). The concept of Trusted Change as implemented relies on not only trusted executable code, but also trusted installers—whether an actual binary executable, or more often a data repository processed by another executable image file.

Installation typically involves an installer application plus associated dynamically loaded libraries. The installer application does all or part of the following:
1. Copies various executables to destination directories on the target machine (may also overwrite or delete existing executable files)
2. Copies various configuration files to destination directories on the target machine (may also overwrite, edit, or delete existing configuration files)
3. Manipulates/modifies various configuration/data files (e.g., registry) on the target machine During the install process, the installer application may load other libraries—the security software should also enforce the privilege level at which the installer runs.

For example, to implement trusted change based on a trusted digital signature, some implementations may require that all of the following to be true:
1. the source of the installer application is trusted
2. the installer application should be signed
3. the libraries loaded by the installer application should be signed
4. the installer runs at the correct privilege level.
5. all existing configuration files that are edited must be specified as
"writable" in the file policy. This list of existing configuration files can be
specified in a higher-level "application action" policy.
6. the destination directory (directories) of the files that are copied by the installer must be specified as "writable" in the file policy. This list of destination directories can be specified in a higher-level "application action" policy.

The process of application uninstallation is then a complementary process. Note that in some embodiments, it may be desirable to trap registration of the corresponding uninstaller code and record (in a corresponding whitelist entry) a trust attribute. In this way, a registered uninstaller will be able to both execute and (based on the trust conveyed) remove code introduced by the trusted installer, when and if later called upon to do so.

Trusted Application

To identify an application, the system keeps a list of application names that are qualified with one or more attributes, but not limited to these specific identification techniques. The application, which is a specific executable image, installer file, script, library, downloadable binary resource like an ActiveX control, or other dynamically loaded executable, installer, or interpreted code, can be identified by cryptographically hashing the file with method available such as SHA-0, SHA-1, SHA-256/224, SHA-512/384, MD5, CRC, etc. One can use this hash in combination with but not limited to the filename of the image as a unique signature for the executable. Another technique is a fully qualified path location of the image file. This path location could be but not limited to a fully qualified pathname, with our without wildcard characters, a Universal Resource Locator (URL) with or without any portion of the image name itself.

When an application image as described above is selected for execution by an end-point client system, the system compares the image name to the list or collection of trusted applications to determine if the selected image for execution is in the list or collection. If the image matches the credentials in the list or collection either by comparing the hash or the filename path, the application will be tagged as trusted and the system will apply it to the list of trusted applications and permit the selected image to execute. This is list or collection is dynamic and will be compared each time the application is executed.

If the application is not in the trusted list, then the user on the client operating system will be prompted as whether to proceed or not. If the user on the client selects to continue, the application will execute. The user could optionally be prompted to remember this choice. The system would then remember the choice to continue by adding the application to the list or collection of trusted applications.

Trusted System Management

Trusted System Management is a system management system which can execute an application which can be a binary image or a script on the behalf of a systems administrator to perform administrative functions on a client operating system. A system management system can be identified by an image as described in trusted applications. This trusted image however can spawn other application images or scripts on the behalf of the system management application to perform administrative functions. Executable images initiated by the trusted system management system are then included by default in the list of trusted applications without having to list them separately. When an application or script is initiated on the client operating system, the system checks whether the trusted system management tool initiated the application or script. It can do this by, for example, checking the process tree of the client operating system. If the trusted system management tool has been identified to initiate the application or script then the application or script will be considered trusted and the system will allow executing of the said application or script—this process can continue for any child process down the chain.

Typically, trusted images and scripts that gain their trust in this way are trusted only during the time span in which the system management tool has initiated the execution. Alternatively, in some implementations, a configuration option can be implemented to allow the trusted applications or scripts executed during the trusted system management change to be added to the list of trusted applications that apply to this client. The next time the application or script is executed it would be in the list of trusted applications. This would not only apply to the system management applications but also to the applications or scripts that were installed or modified during the trusted system management change.

Trusted Network Share

A trusted network share is a file location that identifies multiple trusted applications that are trusted without explicitly listing them. The trusted share can be but not limited to any of the well know network file sharing techniques. In addition to including a class of explicitly defined trusted applications, the security software may also function by checking the literal source of the executable as follows. The application or script is initiated, the system checks whether the application or script is loaded from the trusted share. It can do this by, for example, checking the full path of the file and comparing the directory portion of the file pathname to see if the directory is in the trusted share list. The network path may also be specified by an URL/URI. This URL/URI identification contains a scheme for identifying network paths. Schemes for identifying paths are defined but not limited to the following IETF RFC's: RFC 1738, RFC 2056, RFC 2141, RFC 2192, RFC 2224, RFC 2229, RFC 2244, RFC 2255, RFC 2368, RFC 2384, RFC 2392, RFC 2397, RFC 2518, RFC 2616, RFC 2806, RFC 2817, RFC 3261, RFC 3508, RFC 3588, RFC 3859, RFC 3860, RFC 3966, RFC 3969, RFC 4078, RFC 4088, RFC 4156, RFC 4248, RFC 4266, RFC 4324, RFC 4501, RFC 4516, RFC 4622, RFC 5122.

If the application or script is identified from the trusted share, the application or script is allowed to execute as trusted until completed. Any other applications or scripts that are initiated by the application or script are also treated as trusted until the application or script is completed. Optionally all of these applications and scripts that are initiated are then added to the list of trusted applications and scripts for the client.

Trusted Digital Signature

A digital signature is historically generated from a document by using a cryptographic hash algorithm against a file (or text or a document)—for this specific scenario, against a specific executable image, installer file, script, library, downloadable binary resource like an ActiveX control, or other dynamically loaded executable, installer, or interpreted code, to create a unique message digest identifying the object being hashed. This message digest is then cryptographically encrypted via a private key, to create a digital signature. This digital signature is often then attached to the original source file as a header or end tailer.

Digital Signatures are used for two purposes—first, repudiation that the source of the file is indeed a trusted principal, and secondarily, to ensure that the file has not been tampered with or modified since the original principal created and signed the file. In this sense, Digital Signatures are used primarily to establish trust for the consumer from software publishers. Examples of file types that are digitally signed today include (but are not limited to) Java applets/applications/JAR files, ActiveX controls or other Windows COM (Component Object Model) objects or other Authenticode signed objects.

By defining a Digital Signature as a Trusted Digital Signature, the original digital signature from the file is copied out by the security software, and optionally its authenticity is verified by navigating the root certificate chain. Once established as a verified trusted digital signature, any executable image, installer file, script, library, downloadable binary resource like an ActiveX control, or other dynamically loaded executable, installer, or interpreted code, signed using the same digital signature will In addition to trusting static signed objects/files, but the "dynamic" processes that are created such as application installers/uninstallers and post-setup/post-removal cleanup utilities—whether they are signed by the same principal or not.

Also, the concept of an augmented digital signature is to be considered. While digital signatures are based on the message digest, which is computed solely on the document's data content, in order to establish an additional layer of repudiation could be built into the contents added to the message digest, identifying the source of the file as well. For example, it could include a machine source identifier such as a universally unique ID, which could include system name, fully qualified domain name, IP address, MAC address, UUID, or other system unique identifier.

Trusted User

A significant hurdle to productivity is the lack of the right/best tools to perform the work at hand. In relation to computer, the availability of the right application or program will limit or prevent the job at hand from being completed. Within the security envelope provided by whitelisting, the number of tools (whitelisted applications or programs) is limited to those already on the whitelist. This limited tool set, in certain environments may become a hindrance to productivity.

When a new type of task or workflow presents itself, a new tool may be required to address it. For example, a change in regulation requires an additional step of auditing information at step 5 in a 10 step workflow. While a new tool/application may be available to follow the new workflow the tool/application may not be on the whitelist.

Alternatively, a new application or a new version of an existing tool/application better suited for an existing workflow may become available. For the period of time between the release of the application and the application appearing on the whitelist, potential productivity gains are lost.

These and similar situations typically occur when access to the certified methods and locations of whitelisting upgrade mechanism are unavailable. For example, the system is at a remote site with no connectivity to the central whitelisting system for adding to or upgrading and tools/applications available. To alleviate this limited time and compelling need a special user of the system can be created by the root/primary managers of the whitelisting system. This Trusted User is provided with additional abilities and is required to perform additional actions to limit loss of productivity without compromising the security of the system.

Implementation Details—A trusted user is defined here as someone with the ability and responsibility to modify the whitelist for a specific system. These powers are granted on a temporary basis with the presentation to the whitelisting security environment of additional credentials and allow the introduction of untrusted software tools/applications into the whitelist. These credentials may be in the form of usernames/ passwords, challenge/response, and/or CAPTCHA type verification, and two factor authentication such as smart cards.

While a Trusted User—the presentation of credentials and/or temporary reduction in protection by the Trusted User triggers a limited functionality mode on the system. No user applications are allowed to be started and the ones currently running must be shut down. This limited function could be enforced by shutting down or suspending all user processes/applications and disabling the starting of any new applications. Such a limited functionality mode would ensure accurate auditing of the installation process for the new tools/applications being added as well as greater security in terms of identifying and isolating any threat presented by the new application.

Additional Auditing during Trusted User phase—Auditing and logging is automatically set to the maximum while a Trusted User is operating on the system, specifically while the Trusted User privilege is being utilized. The increased information gathered during this state could potentially be used at a subsequent point in time to undo the installation or upgrade. It can also be used to isolate and identify the specific changes related to the specific installation or upgrade. The increased auditing may include the backing up of existing files that are changed as a result of the installation or upgrade. For example may programs can use the same library included by the system provider. The upgrade of and application may include an upgrade of the common library to a more recent version of the library used by multiple applications on the system.

Trust chaining—The trusted user may not be presented with a carte blanche in regards to the source of new tools/applications. Beyond the central repository of the whitelisting systems as a source for trusted applications, one level of Trusted User may be allowed to only upgrade existing signed applications while not being able to install new applications. In this scenario, the well-known source and trust chains in the certificates of the existing applications are authenticated and must match the source and trust chain of the potential upgrade. For example, if the Trusted User wishes to upgrade Adobe Reader on a whitelist system the source and chain of the source of the upgrade and the signature on the installation must be verified and must match the existing Adobe Reader, i.e. the source must be Adobe.com and/or a root certificate on the upgrade must match the certificate on the original installation.

Reconnection and verification or removal—When the system returns to a location with electronic connectivity with the whitelisting network an audit of all the changes on the system will be performed. Before the returning system is allowed to integrate into the general network, it must be certified as clean. This will restrict any damage caused by malicious untrusted software installed accidentally or maliciously by the Trusted User.

The audit may include a removal of the new applications installed by the Trusted User. Alternatively, it may include certification of the new application(s) as trusted and changes may be propagated to other systems in the whitelisting network.

An Example Implementation

Based on the description herein persons of ordinary skill in the art will appreciate a wide variety of concrete implementations, typically including at least some software executing (often in kernel mode) on a computer for which the whitelist based protections described herein are operant. In some deployments, a management infrastructure may coordinate activities of multiple client instances of the above described security infrastructures.

Figure 10:
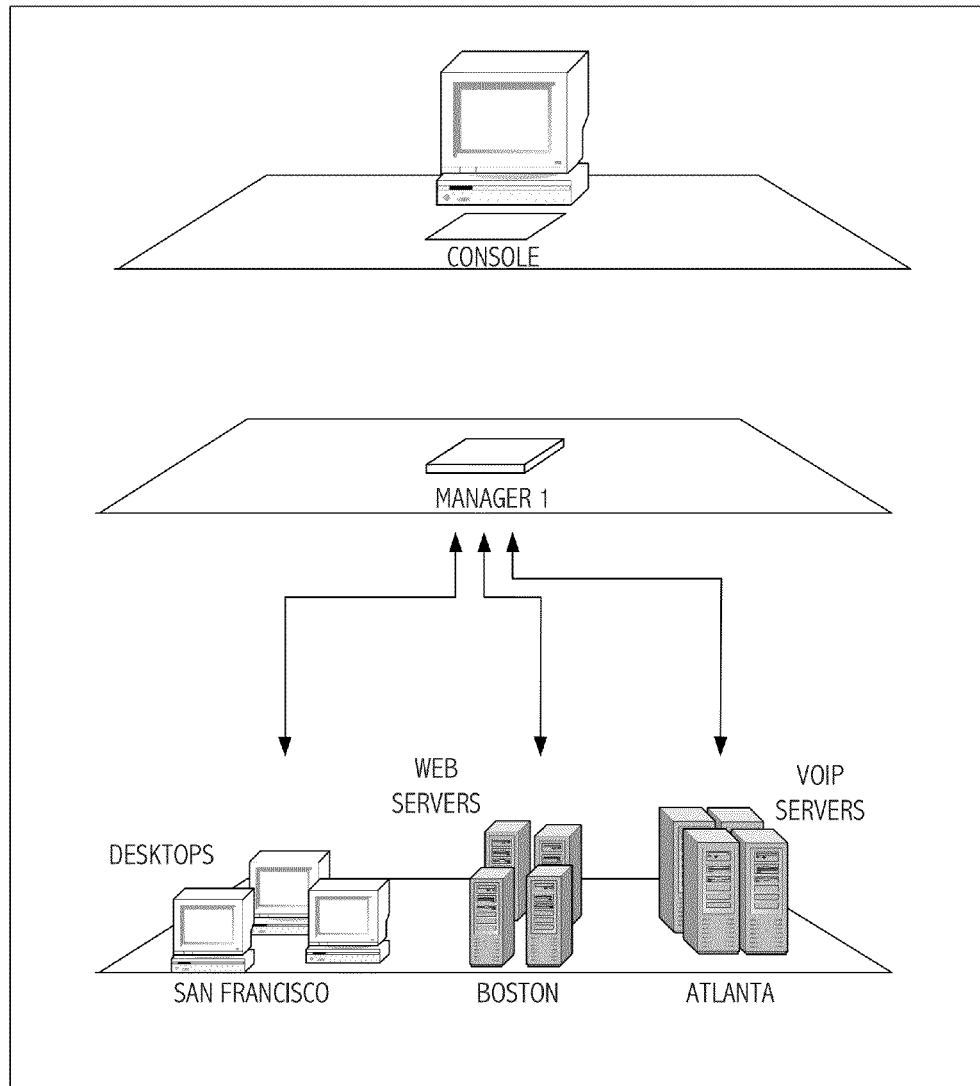
FIG. 10 illustrates a three-tiered console/manager/client architecture provided in accord with some implementations.

In some cases, particular host devices may support console and configuration management facilities. For example, FIG. 10 illustrates some implementations in accordance with the present invention, which include the following major components:

a console;

a manager appliance; an software clients that are installed on each managed endpoint, together with secure communications infrastructure linking these components together.

Of course, some or all of these major components may be implemented as software executing on general purpose computational machines (or on virtualizations thereof). Accordingly, persons of ordinary skill in the art will appreciate that individual components of the three-tiered console/manager/client architecture illustrated in FIG. 10 may be hosted on specialized or dedicated devices or using general purpose computing facilities. Hosting decisions will, in general, depend upon design goals, deployment particulars or other implementation-specific considerations.

As a result, description herein of any particular hosting configuration will be understood to be illustrative and not limiting. The three-tier architecture illustrated in FIG. 10 provides flexibility in management while providing checks and balances in the security of the product. The client is installed on the endpoint computer to be secured. Management and storage of software is provided by the manager appliance while the console provides a user interface into the system. Certain implementations may achieve scalability by combining additional consoles, managers, and clients based on needs of the endpoints to be secured and the topology of the network.

OTHER EMBODIMENTS

While the invention(s) is (are) described with reference to various implementations and embodiments, it will be understood that these embodiments are illustrative and that the scope of the invention(s) is not limited to them. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the invention(s).

What is claimed is:

1. A method of managing a whitelist that at least partially governs operation of a computer system, the method comprising:
 (a) storing a computer readable encoding of the whitelist on the computer system, wherein the whitelist comprises:
  (I) a first whitelist entry associated with a first code instance;

wherein the first whitelist entry comprises:
(i) a trust-execute attribute that allows the first code instance to execute on the computer system; and
(ii) a trust-changes attribute that allows at least a third code instance, introduced into the computer system via the first code instance, to be added to the whitelist;
(II) a second whitelist entry associated with a second code instance, wherein the second whitelist is absent of a trust-changes attribute;
(b) responsive to an attempt by the first code instance to introduce the third code instance into the computer system:
(i) checking the first whitelist entry for the presence of the trust-changes attribute and, based thereon;
(ii) extending the whitelist to include a third whitelist entry associated with the third code instance;
wherein the third whitelist entry comprises:
(i) a trust-execute attribute that allows the third code instance to execute on the computer system; and
c) responsive to an attempt by the second code instance to introduce a fourth code instance into the computer system:
(i) checking the second whitelist entry for the presence of a trust-changes attribute;
(ii) determining that the second whitelist entry is absent of a trust-changes attribute; and
(iii) denying the extension of the whitelist to include a fourth whitelist entry associated with the fourth code instance;
(d) executing on the computer system only those code instances allowed by the whitelist;
wherein, the checking (b)(i) and (c)(i), extending (b)(ii) and executing (d) steps are performed by the computer system.

2. The method of claim 1, wherein the whitelist associates individual ones of the code instances with trust attributes therefor by correspondence with respective files in a computer system.

3. The method of claim 1, wherein the first whitelist entry comprises:
a size of a first file in a file-system from which the first code instance is loaded into memory and executed;
a name of the first file;
a hash, a digital signature, authentication code, checksum, fingerprint or other cryptographic digest that verifies integrity of the first file.

4. The method of claim 3, wherein the first whitelist entry comprises:
a path to the first file, wherein the path is specified with or without wildcards.

5. The method of claim 4, wherein the first whitelist entry comprises:
a full path to the first file, specified with or without wildcards.

6. The method of claim 3, wherein the first whitelist entry comprises one or more additional trust attributes selected from a set thereof that when individually set/cleared, direct a kernel resident security feature to:
allow/disallow read access to the first file;
allow/disallow overwriting of the first file;
allow/disallow loading of the first file into memory and execution thereof; and
allow/disallow deletion of the first file from the file-system.

7. The method of claim 3, wherein trust attributes are encoded independent of file-system permissions.

8. The method of claim 3, wherein the second whitelist entry comprises:
a size of a second file in the file-system from which the second code instance may be loaded into memory and executed;
a name of the second file and a path thereto; and
a hash, a digital signature, authentication code, checksum, fingerprint or other cryptographic digest usable to verify integrity of the second file.

9. The method of claim 1, wherein existence of the first whitelist entry constitutes a trust-execute attribute.

10. The method of claim 1, further comprising:
interposing on file system operations and, as a condition precedent to execution of any particular code instance, determining that an associated whitelist entry includes a trust-execute attribute.

11. The method of claim 10, wherein the interposing on file system operations includes one or more of:
hooking file system calls;
hooking a function pointer table in an operating system kernel; and interposing a file filter driver.

12. The method of claim 1, further comprising:
maintaining in correspondence with call sequences of code executing on the computer system, a data structure that encodes for a given process, correspondence back to an operative entry of the whitelist.

13. The method of claim 12, further comprising:
interposing on a write-type operation performed by the first code instance executed based on a call sequence traceable to the first code instance; and
as a condition precedent to allowing the interposed upon write-type operation to introduce into the computer system an executable file loadable as the second code instance, checking to ensure that the first whitelist entry includes a trust-changes attribute.

14. The method of claim 12, wherein the trust-changes attribute encoded in the first whitelist entry conveys effective trust for changes to the third code instance executed based on a call sequence traceable to the first code instance when there is a whitelist entry that includes a trust-execute attribute associated with each code instance along the call sequence.

15. The method of claim 1, further comprising:
tracking processes and call sequences thereof by interposing on file system operations and, at least with respect to those file system operations incident to a transfer of control to the third code instance, as a condition precedent to execution of the third code instance, determining that a corresponding whitelist entry includes a trust-execute attribute.

16. The method of claim 1,
wherein the first code instance executes as an trusted installer process; and
wherein the introduction of the second code instance into the computer system is performed by a service based on an interprocess communication from the trusted installer process.

17. The method of claim 1, wherein the third code instance operates as a service shared amongst trusted and potentially un-trusted callers, the method further comprising:
tracking interprocess communications between the first code instance operating as a trusted installer, the interprocess communications tracking including:
interposing on interprocess communications initiated by the first code instance and capturing identifying indicia therefor;
interposing on an operation of the third code instance to identify a particular invocation thereof that corresponds with a particular one of the identifying indicia captured for a particular one of the interprocess communications initiated by the first code instance; and based on an affirmative correspondence, propagating effective trust for changes made by the third code instance executed based on the particular interprocess communication traceable to the first code instance.

18. The method of claim 17, wherein the first code instance is an MSiexec process; and wherein the third code instance executes as a DCOM service.

19. The method of claim 1,
wherein the third code instance is a non-executable script or other source for the first code instance which, in turn, constitutes an interpreter, scripting engine or other host therefor; and
wherein the introduction of a fifth code instance into the computer system is performed by the interpreter, scripting engine or other host based on contents of the third code instance.

20. The method of claim 19, further comprising:
interposing on an operation of the first code instance to capture a file-system identifier for the third code instance; and determining whether a whitelist entry associated with the third code instance includes a trust-changes attribute and, if so, propagating effective trust for changes made by the first code instance, including the introduction of the fifth code instance into the computer system, while the third code instance defines an execution context for the first code instance.

21. The method of claim 20,
wherein the first code instance is one of PERL or WINDOWS scripting engine and a shell process; and
wherein the third code instance is one of a PERL or VISUAL BASIC script and a command file.

22. The method of claim 1, wherein the third code instance constitutes a replacement for a code instance executing in the computer system, the method further comprising:
responsive to either or both of:
(i) storage of the second code instance to a protected file system using a temporary identifier; and
(ii) storage of the temporary identifier in a location used by the computer system to initiate later completion of an install;
interposing on operation of the install completion; and
in correspondence with replacement of the previously executing code instance with the second code instance, performing the extension of the whitelist to allow execution of the now introduced third code instance in the computer system.

23. The method of claim 22, wherein the location used by the computer system to initiate later completion of an install is a pending rename registry key.

24. The method of claim 22, including a code instance that implements the install completion in the whitelist.

25. The method of claim 1, wherein the first code instance also introduces an uninstaller code instance into the computer system;
wherein the uninstaller code instance corresponds to, and upon execution attempts to uninstall, the third code instance;
the method further comprising:
interposing on a write-type operation of the first code instance that targets a location used by the computer system to identify uninstaller code; and
extending the whitelist to allow execution of the uninstaller code instance and setting a corresponding trust-changes attribute to allow both later execution of the uninstaller code and modification of the whitelist in correspondence with the uninstall.

26. The method of claim 1, further comprising:
responsive to execution of a first code instance that seeks to remove an executable fifth code instance from the computer system, checking the first whitelist entry and, based thereon;
removing a trust-execute attribute from the whitelist entry associated with the fifth code instance only if the first whitelist includes a trust-changes attribute.

27. The method of claim 1, further comprising:
interdicting execution of code instances not identified by the whitelist.

28. The method of claim 1, wherein the whitelist covers one or more protected stores, including a file system.

29. The method of claim 1, further comprising:
generating a base version of the whitelist based on a set of files that have an associated file-system-based protection attribute set; and
representing extensions, modifications and deletions to the whitelist as delta-coded changes to the base version.

30. The method of claim 1, wherein the second whitelist entry includes a trust-execute attribute; and wherein the second whitelist entry is free of a trust-changes attribute.

31. The method of claim 30, wherein the second whitelist entry is absent of a trust-changes attribute but includes a trust-execute attribute that allows the second code instance to execute on the computer system, the method comprising:
due to the second whitelist entry having a trust-execute attribute, executing the fourth code instance despite the second whitelist entry being absent of a trust-changes attribute.

32. The method of claim 1, wherein the second whitelist entry is absent of a trust-changes attribute but includes a trust-execute attribute that allows the second code instance to execute on the computer system, the method comprising:
due to the second whitelist entry having a trust-execute attribute, executing the fourth code instance despite the second whitelist entry being absent of a trust-changes attribute.

* * * * *